United States Patent
Zhamu et al.

(10) Patent No.: US 8,986,515 B2
(45) Date of Patent: Mar. 24, 2015

(54) PRODUCTION PROCESS FOR CHEMICALLY FUNCTIONALIZED NANO GRAPHENE MATERIALS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 13/573,259

(22) Filed: Sep. 6, 2012

(65) Prior Publication Data

US 2013/0001068 A1    Jan. 3, 2013

(51) Int. Cl.
| | |
|---|---|
| B01J 19/10 | (2006.01) |
| C01B 31/04 | (2006.01) |
| B82Y 30/00 | (2011.01) |
| B82Y 40/00 | (2011.01) |

(52) U.S. Cl.
CPC ............ C01B 31/0469 (2013.01); B01J 19/10 (2013.01); B82Y 30/00 (2013.01); B82Y 40/00 (2013.01); C01B 31/0423 (2013.01); C01B 31/0484 (2013.01)
USPC ............ 204/157.46; 204/157.47; 204/157.42; 204/157.5

(58) Field of Classification Search
CPC ............ C01B 31/0469; C01B 31/0484; C01B 31/0423; B01J 19/10
USPC ................... 204/157.46, 157.47, 157.5
See application file for complete search history.

(56) References Cited

U.S. PATENT DOCUMENTS

| | | | |
|---|---|---|---|
| 2,798,878 A | 7/1957 | Hummers | |
| 7,071,258 B1 | 7/2006 | Jang et al. | |
| 7,563,542 B2 | 7/2009 | Yazami et al. | |
| 8,147,791 B2* | 4/2012 | Gilje | 423/448 |
| 2007/0131915 A1* | 6/2007 | Stankovich et al. | 252/511 |
| 2010/0028559 A1* | 2/2010 | Yan et al. | 427/384 |
| 2011/0052813 A1* | 3/2011 | Ho et al. | 427/256 |
| 2011/0184196 A1* | 7/2011 | Chidsey et al. | 977/748 |

FOREIGN PATENT DOCUMENTS

CN        101428786 A   *  5/2009

OTHER PUBLICATIONS

Machine translation of CN 101428786A.*

(Continued)

*Primary Examiner* — Colleen M Raphael

(57) ABSTRACT

A combined production-functionalization process for producing a chemically functionalized nano graphene material from a pre-intercalated, oxidized, or halogenated graphite material, comprising: (A) Producing exfoliated graphite from the pre-intercalated, oxidized, or halogenated graphite material, wherein the graphite material is selected from the group consisting of natural graphite, artificial graphite, highly oriented pyrolytic graphite, carbon fiber, graphite fiber, carbon nano-fiber, graphitic nano-fiber, meso-carbon micro-bead, graphitized coke, and combinations thereof; (B) Dispersing the exfoliated graphite and an azide or bi-radical compound in a liquid medium to form a suspension; (C) Subjecting the suspension to ultrasonication with ultrasonic waves of a desired intensity for a length of time sufficient to produce nano graphene platelets and to enable a chemical reaction to occur between the nano graphene platelets and the azide or bi-radical compound to produce the functionalized nano graphene material.

12 Claims, 9 Drawing Sheets

(56) References Cited

OTHER PUBLICATIONS

Derwent summary of CN 101428786A.*
Choi et al, "Covalent functionalization of epitaxial graphene by azidotrimethylsilane," J. Phys. Chem. C, vol. 113 (2009), pp. 9433-9435.*
Worsley et al, "Soluble graphene derived from graphite fluoride," Chem. Phys. Lett. 445 (2007) pp. 51-56.*
U.S. Appl. No. 11/800,728, filed May 8, 2007, A. Zhamu, et al.
C. Lee, et al., "Measurement of the Elastic Properties and Intrinsic Strength of Monolayer Graphene," Science, 321 (Jul. 2008) 385-388.
A. Balandin, et al. "Superior Thermal Conductivity of Single-Layer Graphene," Nano Lett., 8 (3) (2008) 902-907.
Bor Z. Jang and A Zhamu, "Processing of Nano Graphene Platelets (NGPs) and NGP Nanocomposites: A Review," J. Materials Sci. 43 (2008) 5092-5101.
K. S. Novoselov, et al. "Electric field effect in atomically thin carbon films," Science 306, 666-669 (2004).
M. Holzinger, et al., J. Am. Chem. Soc. 125 (2003) 8566-8580.
A. Yashiro, et al., Tetrahedron Lett. 39 (1998) 9031-9034.
T. Nakahodo, et al., Angew. Chem., Int. Ed. 47 (2008) 1298-1300.
M. Holzinger, et al., Carbon, 42 (2004) 941-947.
P. N. D. Singh, et al., J. Am. Chem. Soc. 129 (2007) 16263-16272.
C. Gao, et al "Scalable functional group engineering of CNTs by improved one-step nitrene chemistry," Chem Mater. 2009, 21, 360-370.

* cited by examiner

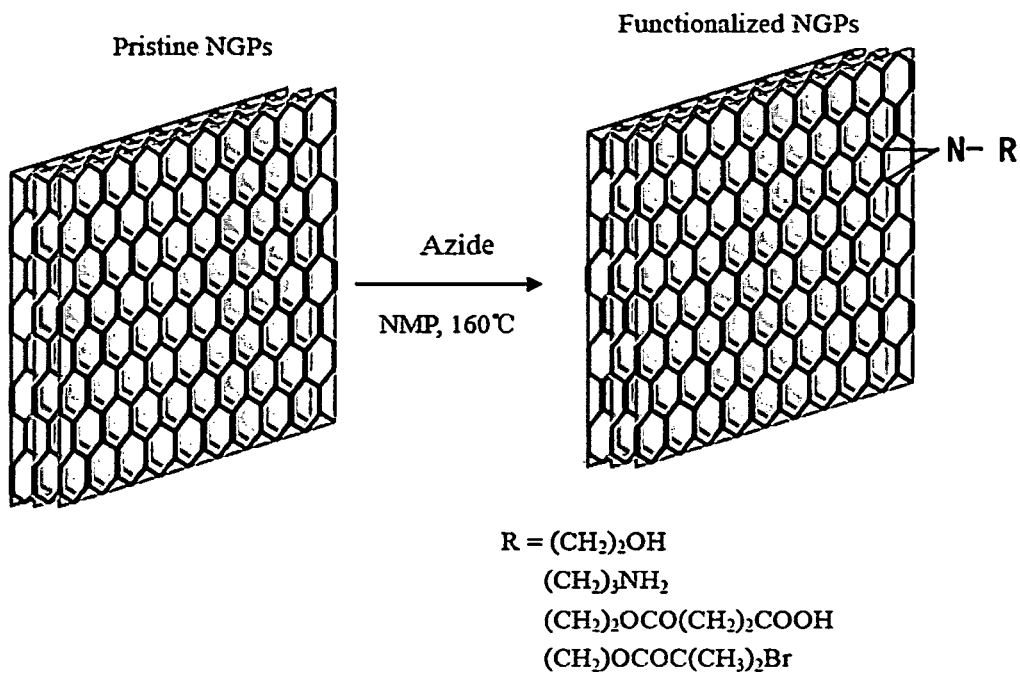
R = $(CH_2)_2OH$
$(CH_2)_3NH_2$
$(CH_2)_2OCO(CH_2)_2COOH$
$(CH_2)OCOC(CH_3)_2Br$
Azide compounds:
(1) 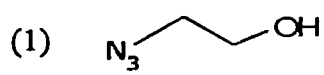
(2) 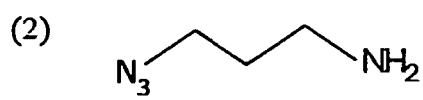
(3) 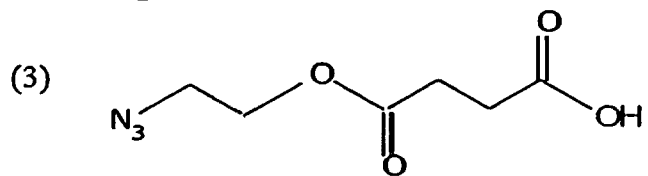
(4) 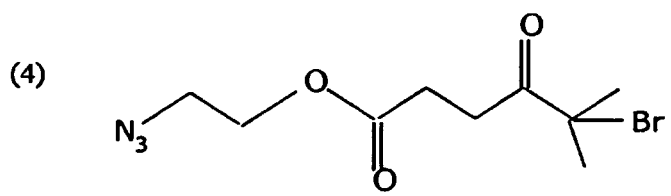
Fig. 3

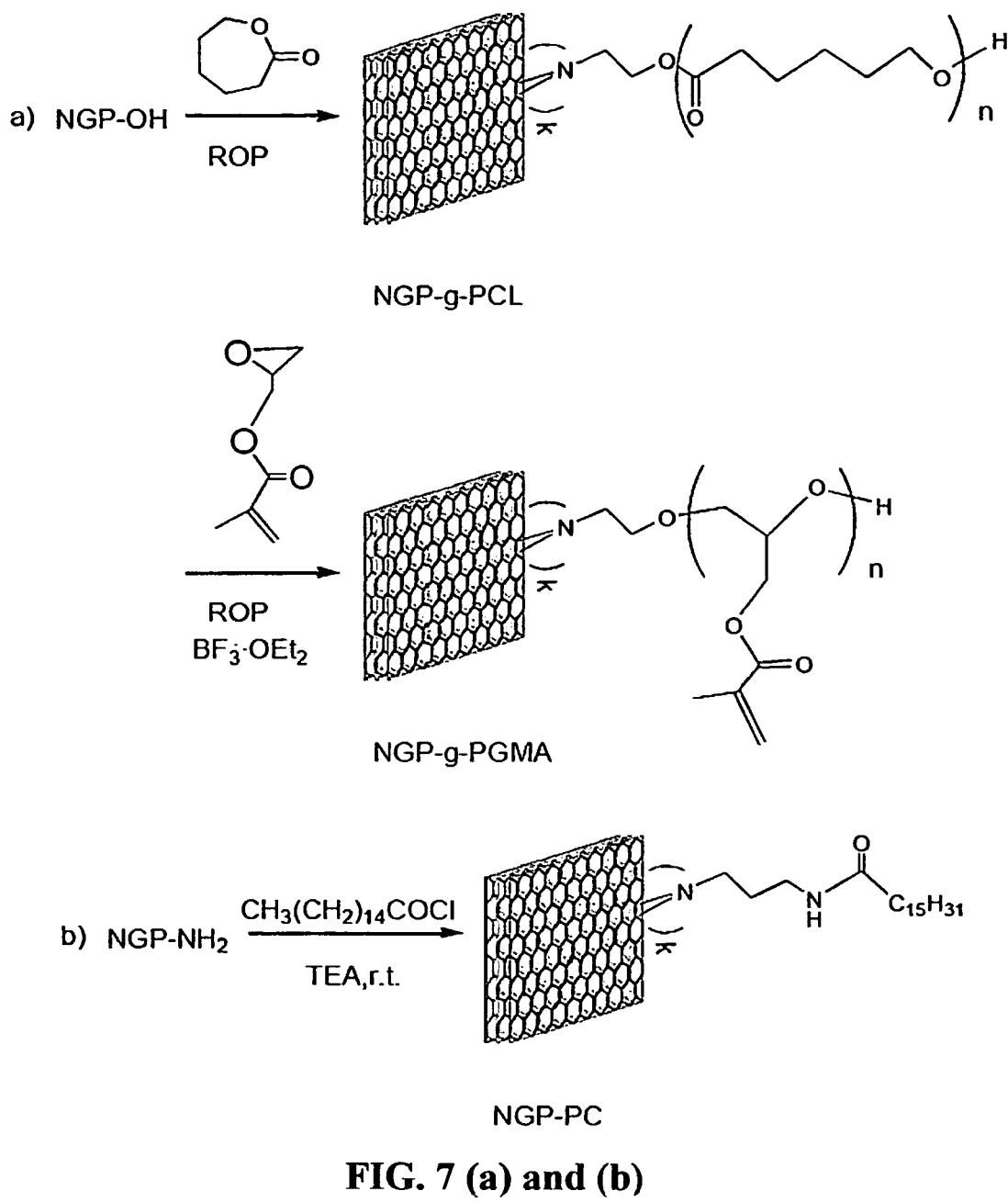
FIG. 7 (a) and (b)

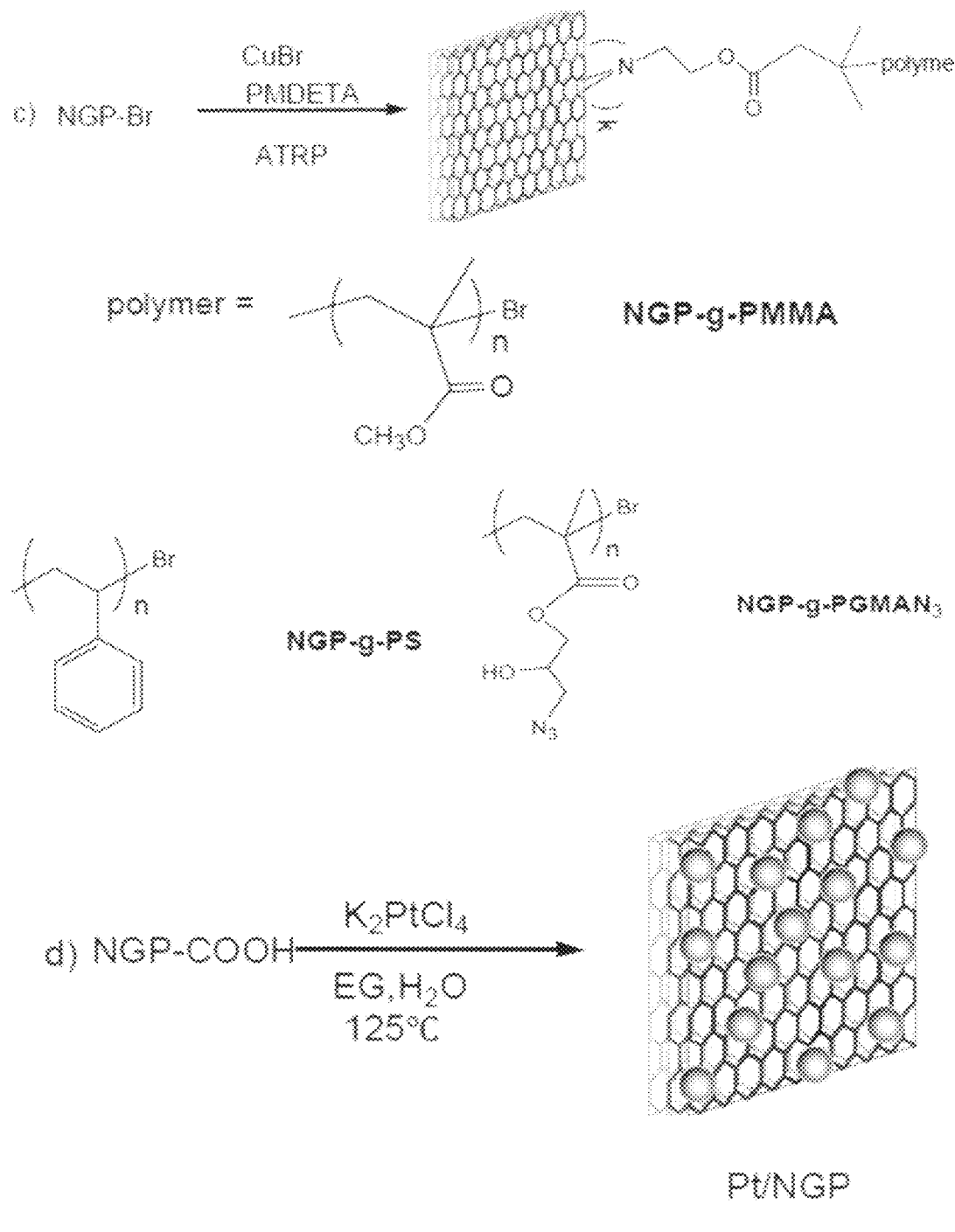
FIG. 7(c) and (d)

PRODUCTION PROCESS FOR CHEMICALLY FUNCTIONALIZED NANO GRAPHENE MATERIALS

This application is a divisional of U.S. Pat. No. 8,287,699. The present invention is a result of a research and development project sponsored by the US National Science Foundation Small Business Technology Transfer (STTR) Program.

FIELD OF THE INVENTION

The present invention relates generally to the field of nano graphene platelets (NGPs), also known as graphene nano sheets or graphene nano ribbons. This invention provides methods and processes for chemically functionalizing NGPs, including both pristine NGPs and their oxidized versions (graphite oxide nano platelets). A primary goal of producing chemically functionalized NGPs is improved solubility of NGPs in a liquid medium, improved dispersibility of NGPs in a matrix material, or enhanced interfacial bonding between NGPs and a matrix material in a composite.

BACKGROUND OF THE INVENTION

Nanocomposites containing a nano-scaled filler possess unique features and functions unavailable in conventional fiber-reinforced polymers. One major filler development in the past two decades is the carbon nanotube (CNT), which has a broad range of nanotechnology applications. However, attempts to produce CNT in large quantities have been fraught with overwhelming challenges due to poor yield and costly fabrication and purification processes. Additionally, even the moderately priced multi-walled CNTs remain too expensive to be used in high volume polymer composite and other functional applications. Further, for many applications, processing of nanocomposites with high CNT concentrations has been difficult due to the high melt viscosity.

Instead of trying to develop lower-cost processes for CNTs, the applicants have sought to develop an alternative nanoscale carbon material with comparable properties that can be produced much more cost-effectively and in larger quantities. This development work led to the discovery of processes and compositions for a new class of nano material now commonly referred to as nano graphene platelets (NGPs), graphene nano sheets, or graphene nano ribbons [e.g., B. Z. Jang and W. C. Huang, "Nano-scaled graphene plates," U.S. Pat. No. 7,071,258, Jul. 4, 2006].

An NGP is a platelet, sheet, or ribbon composed of one or multiple layers of graphene plane, with a thickness as small as 0.34 nm (one atom thick). A single-layer graphene is composed of carbon atoms forming a 2-D hexagonal lattice through strong in-plane covalent bonds. In a multi-layer NGP, several graphene planes are weakly bonded together through van der Waals forces in the thickness-direction. Conceptually, an NGP may be viewed as a flattened sheet of a carbon nano-tube (CNT), with a single-layer graphene corresponding to a single-wall CNT and a multi-layer graphene corresponding to a multi-wall CNT. However, this very difference in geometry also makes electronic structure and related physical and chemical properties very different between NGP and CNT. It is now commonly recognized in the art of nanotechnology that NGP and CNT are two different and distinct classes of materials.

For more than six decades, scientists have presumed that a single-layer graphene sheet (one carbon atom thick) could not exist in its free state based on the reasoning that its planar structure would be thermodynamically unstable. Surprisingly, several groups worldwide (including the applicants) have succeeded in obtaining isolated graphene sheets [e.g., B. Z. Jang, et al, U.S. Pat. No. 7,071,258 (patent application was submitted in October 2002); and K. S, Novoselov, et al. "Electric field effect in atomically thin carbon films," Science 306, 666-669 (2004)].

NGPs are predicted to have a range of unusual physical, chemical, and mechanical properties and several unique properties have been observed. For instance, single-layer graphene was found to exhibit the highest intrinsic strength and highest thermal conductivity of all existing materials [C. Lee, et al., "Measurement of the Elastic Properties and Intrinsic Strength of Monolayer Graphene," Science, 321 (July 2008) 385-388; A. Balandin, et al. "Superior Thermal Conductivity of Single-Layer Graphene," Nano Lett., 8 (3) (2008) 902-907]. Single-sheet NGPs possess twice the specific surface areas compared with single-walled CNTs. In addition to single-layer graphene, multiple-layer graphene platelets also exhibit unique and useful behaviors. Single-layer and multiple-layer graphene are herein collectively referred to as NGPs. Graphene platelets may be oxidized to various extents during their preparation, resulting in graphite oxide (GO) platelets. In the present context, NGPs refer to both "pristine graphene" containing no oxygen and "GO nano platelets" of various oxygen contents. It is helpful to herein describe how NGPs are produced.

The processes that have been used to prepare NGPs were recently reviewed by the applicants [Bor Z. Jang and A Zhamu, "Processing of Nano Graphene Platelets (NGPs) and NGP Nanocomposites: A Review," J. Materials Sci. 43 (2008) 5092-5101]. As illustrated in FIG. 1, the most commonly used process entails treating a natural graphite powder (referred to as Product (A) in FIG. 1) with an intercalant and an oxidant (e.g., concentrated sulfuric acid and nitric acid, respectively) to obtain a graphite intercalation compound (GIC) or, actually, graphite oxide (GO) (referred to as Product (B) in FIG. 1). Prior to intercalation or oxidation, graphite has an inter-graphene plane spacing of approximately 0.335 nm ($L_d = \frac{1}{2} d_{002} = 0.335$ nm or 3.35 Å, based on X-ray diffraction data readily available in open literature). There is a misconception in the scientific community that van der Waals forces are weak forces, which needs some qualifications. It is well-known that van der Waals forces are short range forces, but can be extremely strong in magnitude if the separation between two objects (e.g., two atoms or molecules) is very small, say <0.4 nm. However, the magnitude of van der Waals forces drops precipitously when the separation increases just slightly. Since the inter-graphene plane distance in un-intercalated and un-oxidized graphite crystal is small (<0.34 nm), the inter-graphene bonds (van der Waals forces) are actually very strong.

With an intercalation or oxidation treatment, the inter-graphene spacing is increased to a value typically greater than 0.55-0.65 nm. This is the first expansion stage experienced by the graphite material. The van der Waals forces are now significantly weakened due to the increased spacing. It is important to note that, in most cases, some of the graphene layers in a GIC are intercalated (with inter-graphene spacing increased to 0.55-0.65 nm and van der Waals forces weakened), but other layers could remain un-intercalated or incompletely intercalated (with inter-graphene spacing remaining approximately 0.34 nm and van der Waals forces staying strong).

In the conventional processes, the obtained GIC or GO, dispersed in the intercalant solution, will need to be rinsed for several cycles and then dried to obtain GIC or GO powders. These dried powders, commonly referred to as expandable graphite, are then subjected to further expansion or second expansion (often referred to as exfoliation) typically using a thermal shock exposure approach (at a temperature from 650° C. to 1,100° C.). The acid molecules residing in the inter-graphene spacing are decomposed at such a high temperature, generating volatile gas molecules that could push apart graphene planes. The inter-flake distance between two loosely connected flakes or platelets is now increased to the range of typically >20 nm to several μm (hence, very weak van der Waals forces).

Unfortunately, typically a significant portion of the gaseous molecules escape without contributing to exfoliation of graphite flakes. Further, those un-intercalated and incompletely intercalated graphite layers remain intact (still having an inter-graphene spacing of approximately <0.34 nm). Additionally, many of the exfoliated flakes re-stack together by re-forming van der Waals forces if they could not be properly separated in time. These effects during this exfoliation step led to the formation of exfoliated graphite (referred to as Product (C) in FIG. 1), which is commonly referred to as "graphite worm" in the industry.

The exfoliated graphite or graphite worm is characterized by having networks of interconnected (un-separated) flakes which are typically >50 nm thick (often >100 nm thick). These individual flakes are each composed of hundreds of layers with inter-layer spacing of approximately 0.34 nm (not 0.6 nm), as evidenced by the X-ray diffraction data readily available in the open literature. In other words, these flakes, if separated, are individual graphite particles, rather than graphite intercalation compound (GIC) particles. This thermal shock procedure can produce some separated graphite flakes or graphene sheets, but normally the majority of graphite flakes remain interconnected. Again, the inter-flake distance between two loosely connected flakes or platelets is now increased to from 20 nm to several μm and, hence, the ven der Waals forces that hold them together are now very weak, enabling easy separation by mechanical shearing or ultrasonication.

Typically, the exfoliated graphite or graphite worm is then subjected to a sheet or flake separation treatment using air milling, mechanical shearing, or ultrasonication in a liquid (e.g., water). Hence, a conventional process basically entails three distinct procedures: first expansion (oxidation or intercalation), further expansion (so called "exfoliation"), and separation. The resulting NGPs are graphene oxide (GO) rather than pristine graphene.

It is important to note that the separation treatment (e.g. using ultrasonication or shearing) is to separate those thick flakes from one another (breaking up the graphite worm or sever those weak interconnections), and it is not intended for further peeling off individual graphene planes. In the prior art, a person of ordinary skill would believe that ultrasonication is incapable of peeling off non-intercalated/un-oxidized graphene layers. In other words, in the conventional processes, the post-exfoliation ultrasonication procedure was meant to break up graphite worms (i.e., to separate those already largely expanded/exfoliated flakes that are only loosely connected). Specifically, it is important to further emphasize the fact that, in the prior art processes, ultrasonification is used after intercalation and oxidation of graphite (i.e., after first expansion) and most typically after thermal shock exposure of the resulting GIC or GO (i.e., after second expansion or exfoliation) to aid in breaking up those graphite worms. There are already much larger spacings between flakes after intercalation and/or after exfoliation (hence, making it possible to easily separate flakes by ultrasonic waves). This ultrasonication was not perceived to be capable of separating those un-intercalated/un-oxidized layers where the inter-graphene spacing remains <0.34 nm and the van der Waals forces remain strong.

The applicant's research group was the very first in the world to surprisingly observe that, under proper conditions (e.g., with the assistance of a surfactant), ultrasonication can be used to produce ultra-thin graphene directly from graphite, without having to go through chemical intercalation or oxidation. This invention was reported in a patent application [A. Zhamu, J. Shi, J. Guo, and Bor Z. Jang, "Method of Producing Exfoliated Graphite, Flexible Graphite, and Nano Graphene Plates," U.S. patent Pending, Ser. No. 11/800,728 (May 8, 2007)]. Schematically shown in FIG. 2 are the essential procedures used to produce single-layer or few-layer graphene using this direct ultrasonication process. This innovative process involves simply dispersing graphite powder particles in a liquid medium (e.g., water, alcohol, or acetone) containing a dispersing agent or surfactant to obtain a suspension. The suspension is then subjected to an ultrasonication treatment, typically at a temperature between 0° C. and 100° C. for 10-120 minutes. No chemical intercalation or oxidation is required. The graphite material has never been exposed to any obnoxious chemical. This process combines expansion, exfoliation, and separation into one step. Hence, this simple yet elegant method obviates the need to expose graphite to a high-temperature, or chemical oxidizing environment. The resulting NGPs are essentially pristine graphene.

In order for NGPs to be an effective nano-filler or reinforcement in a polymer matrix, the surface of NGPs (either pristine graphene or graphene oxide) must be properly functionalized for enhanced dispersion of NGPs in the matrix and improved compatibility or interfacial bonding between NGPs and the matrix polymer. Proper dispersion of NGPs in a matrix would be a prerequisite to achieving good electrical, thermal, and mechanical properties of the resulting composite materials. Hence, the objectives of our recent research and development efforts in chemical functionalization of NGPs that led to the instant application were:

(A) To develop the ability to manipulate the electrical conductivity of individual graphene sheets and that of polymer composites with the specific goals of (1) achieving a high electrical conductivity at a low percolation ratio; (2) establishing a guideline for designing and producing graphene composites with conductivity values within the ranges suitable for static charge dissipation, EMI/RFI shielding, electrostatic spray painting, and fuel cell bipolar plates, respectively. A percolation ratio is the threshold weight fraction or volume fraction of conductive fillers at which the filler particles form a network of electron-conducting paths in an otherwise insulating matrix materials, such as a polymer.

(B) To identify proper functional groups that will prevent graphene sheets from re-stacking upon one another during the preparation of any device or composite (e.g., for supercapacitor electrodes).

(C) To develop chemical functionalization approaches that allow for mass production of functionalized NGPs from both pristine graphene and graphene oxide.

(D) To explore the opportunities of combining or integrating NGP production and chemical functionalization operations into just one or two simple steps.

These objectives have been achieved and are partially summarized in the instant application.

SUMMARY OF THE INVENTION

As a first preferred embodiment, the present invention provides a highly innovative, "combined production-functionalization process" for manufacturing a chemically functionalized nano graphene material directly from a pristine graphite material. The process comprises (A) Dispersing the pristine graphite material and an azide or bi-radical compound in a liquid medium (comprising a solvent if the compound is in a solid state) to form a suspension; and (B) Subjecting the suspension to direct ultrasonication with ultrasonic waves of a desired intensity for a length of time sufficient to produce nano graphene platelets and to enable a chemical reaction to occur between the nano graphene platelets and the azide or bi-radical compound to produce the functionalized nano graphene material. Concurrent production and functionalization of NGPs directly from pristine graphitic materials are achieved.

This strikingly simple and elegant process essentially integrates the procedures of expanding, exfoliating, separating, and functionalizing graphene planes from a pristine graphite material into ONE single step. No pre-intercalation or oxidation of graphite is required or needed. This is one of the examples of the innovative approaches of the instant application wherein the production of NGPs and chemical functionalization of NGPs are conducted essentially at the same time in the same reactor.

In this process, the azide or bi-radical compound may be added to the liquid medium (containing the pristine graphite material) concurrently or sequentially after direct ultrasonication of the graphite material is allowed to proceed for a short period of time. The starting pristine graphite material may be selected from the group consisting of natural graphite, artificial graphite, highly oriented pyrolytic graphite, carbon fiber, graphite fiber, carbon nano-fiber, graphitic nano-fiber, meso-carbon micro-bead, graphitized coke, and combinations thereof.

The nano graphene platelets produced by this process comprise primarily single-layer or few-layer graphene. In the process, the chemical functionalization reaction may be controllably limited to occur at an edge or edges of the nano graphene platelets. Alternatively, the chemical reaction may be allowed to occur to an edge and at least one primary surface (graphene plane) of the nano graphene platelets.

In this process, the azide or bi-radical compound may be selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups

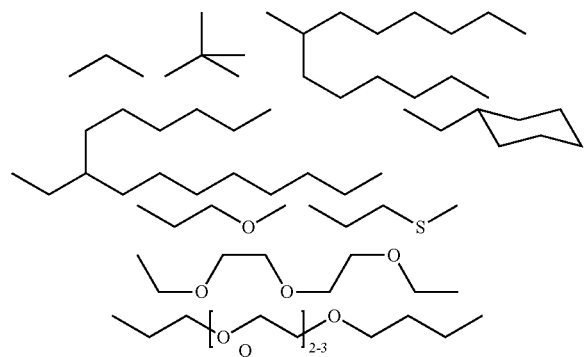

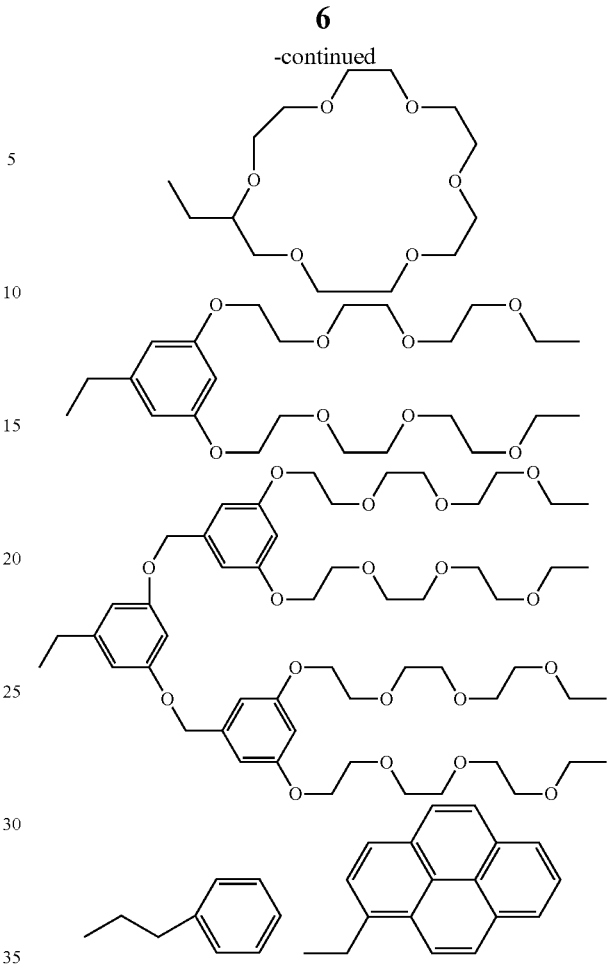

and combinations thereof.

The process may further comprise a step of grafting a polymer chain to a functional group of the functionalized nano graphene material to produce a polymer-grafted nano graphene material. This feature enables the design and production of specially grafted NGPs for use as a nano filler for a specific polymer matrix.

In another preferred embodiment of the present invention, the process could begin with a pre-intercalated, oxidized, or halogenated graphite material. This combined production-functionalization process comprises: (A) Producing exfoliated graphite from the pre-intercalated, oxidized, or halogenated (e.g. fluorinated) graphite material; (B) Dispersing the exfoliated graphite and an azide or bi-radical compound in a liquid medium comprising a solvent to form a suspension; and (C) Subjecting the suspension to ultrasonication with ultrasonic waves of a desired intensity for a length of time sufficient to produce nano graphene platelets and to enable a chemical reaction to occur between the nano graphene platelets and the azide or bi-radical compound to produce the functionalized nano graphene material. The step (A) of producing exfoliated graphite may comprise exposing the pre-intercalated or oxidized graphite material to a temperature higher than 200° C. (more typically higher than 850° C.), a chemical (reactive with the intercalant), ultrasonic waves, or a combination thereof.

Again, in this process, the graphite material is not limited to natural graphite. It may be selected from the group consisting of natural graphite, artificial graphite, highly oriented pyrolytic graphite, carbon fiber, graphite fiber, carbon nano-fiber, graphitic nano-fiber, meso-carbon micro-bead, graphitized coke, and combinations thereof. Again, the produced nano graphene platelets comprise single-layer graphene. The chemical reaction may be controlled to occur only to an edge or edges of the nano graphene platelets, or to an edge and at least one primary surface of the nano graphene platelets. The process may further comprise a step of grafting a polymer chain to a functional group of the functionalized nano graphene material to produce a polymer-grafted nano graphene material.

Still another preferred embodiment of the present invention is a combined production-functionalization process for producing a chemically functionalized nano graphene material from a pre-intercalated, oxidized, or halogenated graphite material. The process comprises: (A) Dispersing the pre-intercalated, oxidized, or halogenated graphite material and an azide or bi-radical compound in a liquid medium comprising a solvent to form a suspension; (B) Subjecting the suspension to ultrasonication with ultrasonic waves of a desired intensity for a length of time sufficient to produce nano graphene platelets and to enable a chemical reaction to occur between the nano graphene platelets and the azide or bi-radical compound to produce the functionalized nano graphene material.

In this process, the pre-intercalated, oxidized, or halogenated graphite does not have to go through exfoliation (to produce exfoliated graphite worms) and flake separation (breakage of graphite worms). These two procedures are automatically accomplished concurrently with the chemical functionalization procedure in the ultrasonication reactor vessel. Alternatively, the azide compound may be added to the liquid medium sequentially after direct ultrasonication of the graphite material is allowed to proceed for a desired period of time. This is another example to illustrate the innovation that NGP production and chemical functionalization are achieved concurrently and in the same reactor. This is also a highly innovative process that has never been disclosed or even slightly hinted in the prior art.

In another process, the NGPs are made on a separate basis. The process comprises (A) mixing a starting nano graphene material (having edges and two primary surfaces), an azide or bi-radical compound, and an organic solvent in a reactor, and (B) allowing a chemical reaction between the nano graphene material and the azide compound to proceed at a temperature for a length of time sufficient to produce the functionalized nano graphene material.

The starting nano graphene material may comprise pristine graphene, graphene oxide, graphene fluoride, graphene chloride, or a combination thereof. Again, the chemical reaction may be prescribed to occur only to an edge or edges of the nano graphene material, or to an edge and at least one primary surface of the nano graphene material. A wide range of azide or bi-radical compounds may be used in the process. The process may further comprise a step of grafting a polymer chain to a functional group of the functionalized nano graphene material to produce a polymer-grafted nano graphene material.

In general, a combined production-functionalization process for manufacturing a chemically functionalized nano graphene material from a graphite material has been developed. This highly innovative process comprises: (A) Dispersing a graphite material and a bi-functional or multi-functional compound in a liquid medium to form a suspension; and (B) Subjecting the suspension to direct ultrasonication with ultrasonic waves of a desired intensity for a length of time sufficient to produce nano graphene platelets and to enable a chemical reaction to occur between the nano graphene platelets and the compound to produce the functionalized nano graphene material.

The bi-functional or multi-functional compounds have two, three, four, or more functional groups (e.g., $-NH_2$) at their two, three, four, or more ends, respectively. At least one of the functional groups is capable of reacting with an NGP at an edge or graphene plane.

The graphite material may be selected from a wide range of graphitic materials, including natural graphite, artificial graphite, highly oriented pyrolytic graphite, carbon fiber, graphite fiber, carbon nano-fiber, graphitic nano-fiber, meso-carbon micro-bead, graphitized coke, pre-intercalated versions thereof, pre-oxidized versions thereof, pre-fluorinated versions thereof, chemically modified versions thereof, and combinations thereof. Oxidation, fluorination, and other chemical modifications (e.g., halogenation) of graphite are well-known in the art. The presently invented process is applicable to pristine versions and various chemically modified versions of the above-listed graphitic materials.

The chemically functionalized nano graphene platelets produced with this process typically comprise a significant portion of single-layer graphene. The chemical reaction can be controlled to occur only to an edge or edges of the nano graphene platelets or, alternatively, to an edge and at least one primary surface, graphene plane, of said nano graphene platelets.

BRIEF DESCRIPTION OF THE DRAWINGS

FIG. 3 Schematic showing the reactions between pristine graphene and several azide compounds (as illustrative examples) to form functionalized NGPs.

FIG. 7 Grafting of different polymers (a)-(c) or attaching Pt nano particles (d) to various functionalized NGPs, as means to verify the presence of functional groups.

DETAILED DESCRIPTION OF PREFERRED EMBODIMENTS

Figure 1:
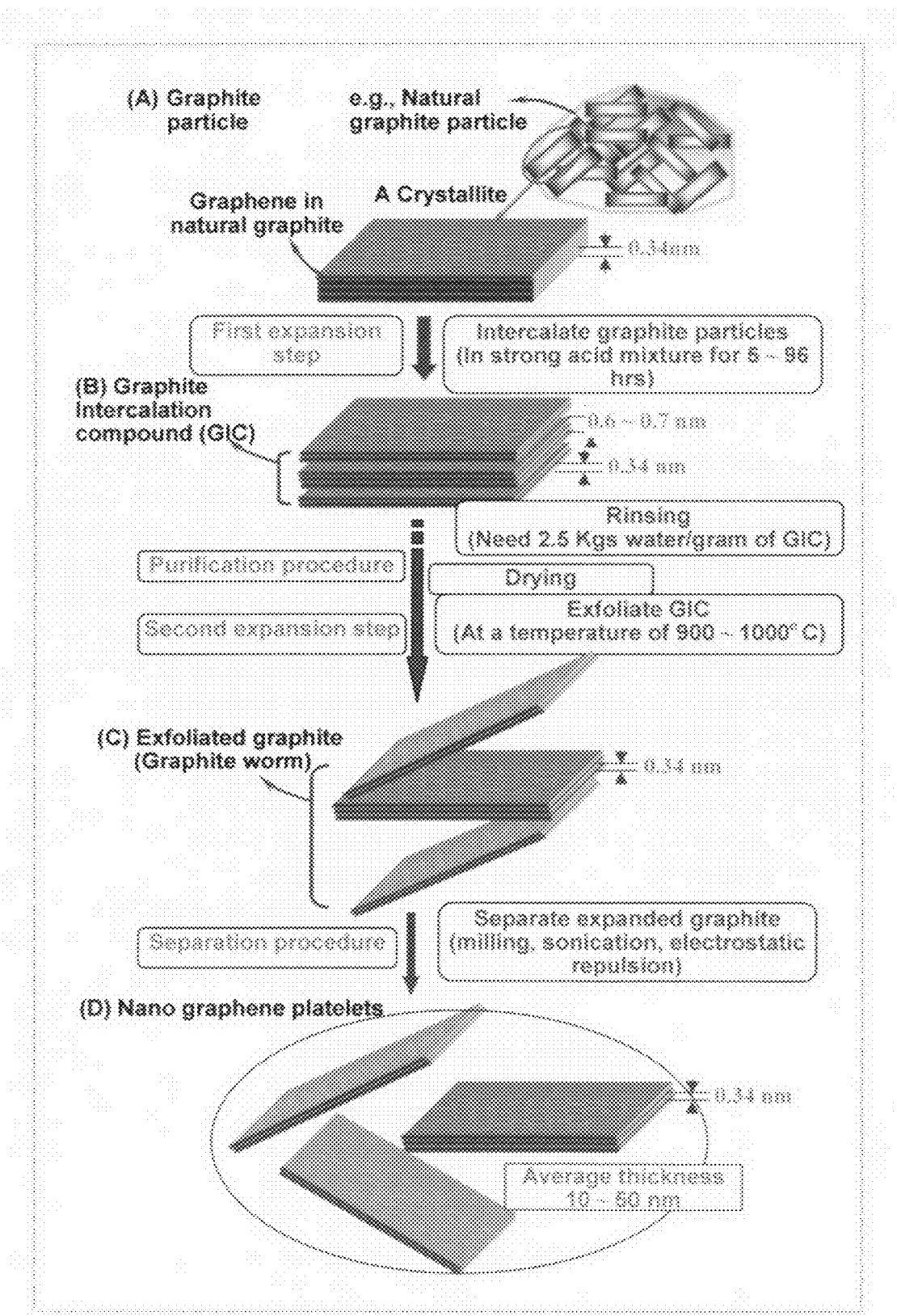
FIG. 1 Conventional, most commonly used chemical processes for producing oxidized NGPs or GO platelets.

Successful functionalization reactions for single-walled (SWNT) and multi-walled (MWNT) carbon nanotubes have been achieved by several groups worldwide. These approaches include defect functionalization, covalent functionalization of the sidewalls, non-covalent exohedral functionalization (e.g., formation of supramolecular adducts with surfactants or polymers), and endohedral functionalization. A most popular approach involves the use of the nanotube-bound carboxylic acids, which are created using strong chemicals, such as concentrated sulfuric acid. The nanotube-bound carboxylic acids are the sites to which a variety of functional groups for the solubilization of CNTs can be attached. These solubilized CNTs allow for solution-based characterizations and investigations.

Due to the similarity in chemical composition and structure between carbon nanotubes (CNTs) and nano graphene platelets (NGPs), one of ordinary skills might expect that all functionalization approaches for CNTs should work for functionalizing NGPs equally well. However, the highly significant differences in geometry and morphology between CNTs and NGPs, as illustrated below, would suggest that the functionalization approaches that work for CNTs may not necessarily work for NGPs, and vice versa. Examples of these differences are:

(a) Geometrically, CNTs are quasi-one-dimensional entities (thin tubes) while NGPs are quasi-two-dimensional (thin sheets);
(b) Although the basic molecular formulation of an NGP is identical to that of a CNT (both being composed of all carbon atoms arranged in a hexagon-type structure), the CNT molecule is curved or rolled up to form a cylindrical shape, effectively changing the electronic structure and related physical and chemical properties;
(c) NGPs have two primary external surfaces that are flat while CNTs have only one external surface that is convex (the interior surface is not readily accessible by chemical species);
(d) Compared to CNTs, NGPs have more edges or more sites where desirable or undesirable functional groups tend to come into existence during the NGP producing process. These functional groups make the characteristics of NGPs fundamentally different from those of CNTs;
(e) In particular, most of the prior art processes are based on chemical oxidation or intercalation of natural graphite, producing NGPs typically in the state of graphene oxide (GO) that already carries oxygen-containing groups, such as hydroxyl, carbonyl, and/or carboxyl. However, in conventional NGP-producing processes, the nature and amount of these groups could not be well-controlled.
(f) In the non-covalent exohedral functionalization of a CNT with a polymer, the entire polymer chain can wrap around a thin tube like a helix. This would normally not be possible for NGPs since the lateral dimensions of a chemically produced graphene sheet are typically much greater than 0.3 µm, more typically between 0.5 µm and 10 µm.

The results of our intensive and extensive research endeavors have been most surprising. In general, when applied to CNTs and NGPs, the same type of chemical functionalization approach works to very different extents, resulting in vastly different improvements in properties for these two classes of carbon nano materials. In many cases, one approach works for one of the two classes of nano materials, but not for the other class.

Further, our purposes of carrying out these research and development efforts were not primarily for trying to differentiate the effectiveness of various chemical approaches to functionalizing NGPs from that of CNTs. Instead, we were more interested in finding ways of controllably varying the chemical and physical properties of graphene and graphene-containing composites or devices. In particular, we recognized that the unique electrical and thermal properties of graphene were among its most promising features for future applications. Understanding these features, and the ways to manipulate and control them, is therefore of paramount importance for practical applications of various forms of graphene. In this regard, a basic understanding of the properties of pristine graphene provides the necessary background for further developments. In particular, chemical functionalization could be used for engineering the properties of graphene towards specific applications.

In several earlier studies, attempts were made to employ some biradical groups, such as dichlorocarbene and nitrene, to modify the double bonds of CNTs [e.g., M. Holzinger, et al., J. Am. Chem. Soc. 125 (2003) 8566-8580] and fullerenes [e.g., A. Yashiro, et al., *Tetrahedron Lett.* 39 (1998) 9031-9034 and T. Nakahodo, et al., *Angew. Chem., Int. Ed* 47 (2008) 1298-1300]. Thus, our first task in the study of chemical functionalization of NGPs was to determine if such carbene or nitrene chemistry could provide an approach for large-scale synthesis of functionalized NGPs. We thought that this approach, if proven feasible, would be advantageous because of the high reactivity of azides and their amenability to be cost-effectively produced in large quantities. A specific goal was to develop a simple or single-step process for large-scale production of soluble or dispersible NGPs with a high density of functional groups from both pristine nano graphene (p-NGP) and graphene oxide (GO). This process could provide facile, green, and cost-effective production of functionalized NGPs.

To evaluate the technical feasibility of the single-step methodology, a series of functional bi-radical or azide compounds (f-azides) were used to react with both single-layer and multi-layer NGPs and, for comparison purposes, both single-wall and multi-wall CNTs. Each f-azide molecule utilized contains an azido group on one end and a functional group (e.g., —OH, —NH2, —COOH, or —Br) on another end, as schematically shown in FIG. 3. These were used as examples only, not intended for limiting the scope of our invention, nevertheless. It was hoped that once the azido group anchors on a primary surface of an NGP, a second functional group extends into the surrounding solvent to help solubilize the NGP. Hopefully, this second functional group is suitable for further chemical modification if so desired.

It is well-known in the art [e.g., M. Holzinger, et al., Carbon, 42 (2004) 941-947] that an azido group may produce two types of reactive intermediate upon thermolysis, i.e., singlet-state nitrenes (having two filled p-orbitals) and triplet-state nitrenes (having one filled p-orbital with two p-orbitals containing unpaired electrons). Both types were known to be capable of attacking the surface of CNTs to impart aziridine rings by an electrophilic [2+1] cycloaddition and reaction between biradicals and the CNT surface's π-system, respectively. In this R&D task, we sought to determine if an azido group could react with our NGPs or somehow anchor on NGPs. We recognized that the procedures to produce f-azides in large quantities from commercially available reagents have been developed. If functional azides can react with NGPs, then functionalized NGPs (f-NGPs) can be cost-effectively produced in large quantities.

In the beginning, we envisioned a strategy for the preparation of functionalized NGPs (f-NGPs), as illustrated in FIG. 3, wherein the azides act as an anchor that attaches a functional group to a surface (or both surfaces) of an NGP. These azide reagents can be easily synthesized from $NaN_3$ and other readily available chemicals. Triazolines could be formed by 1,3-dipolar cycloaddition reactions between organic azides and C=C bonds of graphene surfaces with a concomitant nitrogen loss occurring upon thermolysis [A. Yashiro, et al., *Tetrahedron Lett.* 39 (1998) 9031-9034]. This thermolysis can be visually confirmed by the bubbles coming out of the reaction flask. In addition, thermal activation of alkyl azide precursors should yield some azo and heterocyclic byproduct, causing the reaction solution to become dark brown [P. N. D. Singh, et al., J. Am. Chem. Soc. 129 (2007) 16263-16272].

With this approach in mind, we attempted to obtain four types of model f-NGPs with different reagents of azides: hydroxyl-functionalized NGPs (NGP-OH), amino-functionalized NGPs (NGP-$NH_2$), carboxyl-functionalized NGPs (NGP-COOH), and bromine-functionalized NGPs (NGP-Br). In our studies, functional groups were allowed to react with NGPs to obtain the f-NGPs by mixing pristine NGPs (p-NGPs) or graphene oxide (GO) and functional azides (f-azides) in N-methyl-2-pyrrolidone (NMP) at 160° C. for up to 5 hours. NMP can be readily recycled in the process and is much less expensive than 1,1,2,2-tetrachloroethane (TCE), which was commonly used in functionalizing CNTs. The same reaction conditions were employed to obtain f-CNTs for comparison purposes. In a separate set of samples, both NGPs and CNTs were subjected to the same reaction conditions, but at a much lower temperature (100° C.) for several hours.

Before the reaction was initiated, nitrogen bubbling was allowed to proceed for several minutes to prevent the highly reactive intermediates from reacting with oxygen. Ultrasonication was used to facilitate dispersion of pristine NGPs and CNTs in NMP. Upon completion of necessary reactions, the raw products were separated using direct filtration with filter paper for a large batch, or using precipitation in acetone followed by centrifugation for a small batch. Final f-NGP products were obtained after repeated washing with water or organic solvent.

Six series of thin films were prepared from amino-functionalized f-NGPs and f-CNTs for the purpose of measuring the electrical conductivity of the functionalized p-NGPs (f-p-NGPs), functionalized GO nano platelets (f-GO), and f-CNTs as a function of reaction time and temperature. Each functionalized material was re-dispersed in water to produce a suspension. Thin films from these suspensions were obtained by spin coating. Typical thickness of these thin films was in the range of 2-5 μm. Shown in FIG. 4 and FIG. 5 are a summary of the electrical conductivity data of the films made from p-NGPs, GO, and CNTs after various periods of amino azide reactions at 100° C. and 160° C., respectively.

Figure 4:
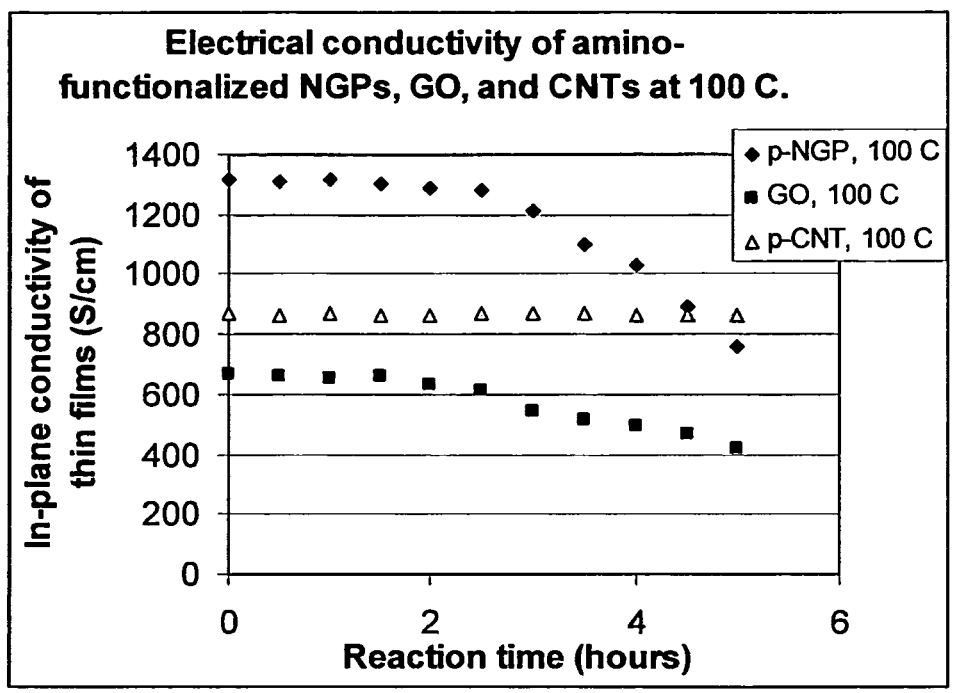
FIG. 4 Electrical conductivity data for the thin films made from pristine NGPs (p-NGPs), GO, and CNTs after various periods of amino azide reactions at 100° C.
Figure 5:
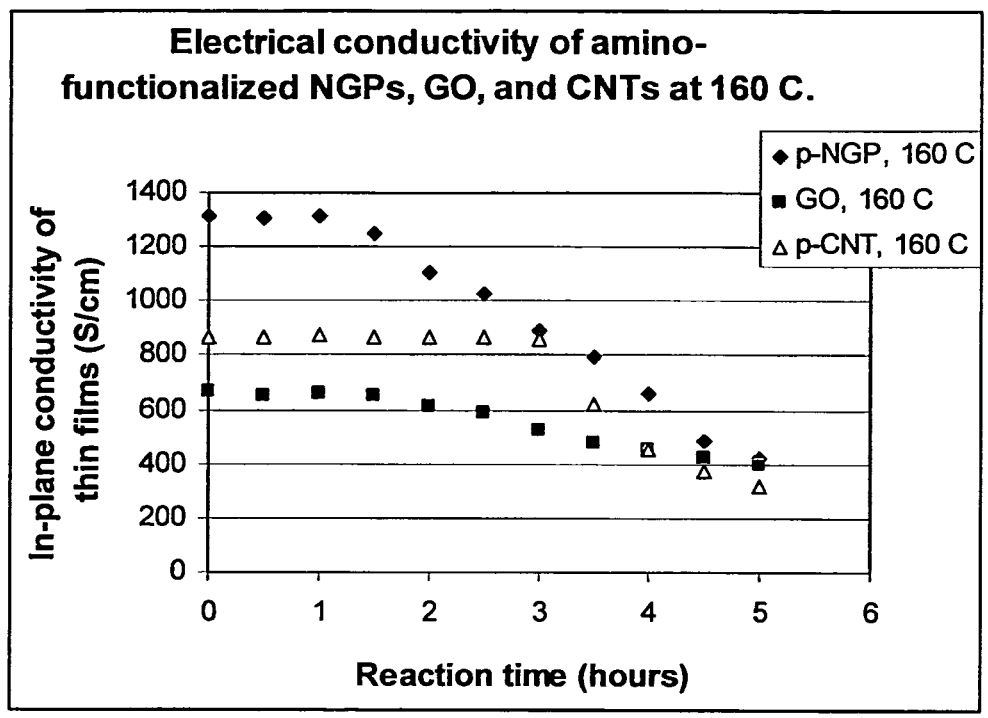
FIG. 5 Electrical conductivity data for the thin films made from pristine NGPs (p-NGPs), GO, and CNTs after various periods of amino azide reactions at 160° C.

FIG. 4 indicates that, at a relatively low reaction temperature (100° C.), both amino-functionalized pristine NGPs and amino-functionalized graphene oxide began to exhibit a significant decrease in electrical conductivity after the reaction proceeded for >1.5 hours. In contrast, the electrical conductivity of CNTs remained essentially unchanged even after 5 hours of azide reactions. In order to help us understand what has happened, if any, to these carbon nano materials as a function of the reaction time, we investigated the infrared spectra of these samples. The results were very surprising. Both pristine NGPs and GO samples, prior to azide reaction, exhibited no signals corresponding to amino group (—$NH_2$). However, after only 30 minutes of reaction, both samples began to exhibit the presence of amino groups and the amounts of amino group increased with increasing reaction time. This was not the case for CNT samples. After 5 hours of reaction at 160° C., there was no sign of —$NH_2$ group being attached to CNTs. This was consistent with the notion that no electrical conductivity change was observed over a reaction period of 5 hours.

The next logical question to ask was why both p-NGPs and GO began to capture the azide group at the early stage of azide reaction, yet did not experience a reduction in electrical conductivity until the reaction times reached 1.5 or 2.0 hours and beyond. Not wishing to be bound by any theory, we speculated that one of the end groups of the azide compound could easily attach to the edges of both p-NGP and GO sheets (or molecules) where dangling bonds, other functional groups, or structural defects were formed during the process of preparing both p-NGPs and GO. There are large amounts of edge surfaces in nano graphene platelets or sheets, including both pristine NGPs or GO. By contrast, there is no edge surface for a pristine CNT; only very little amount of end surface exists at the nanotube tip.

Presumably, the functional groups or defects at the edges of a nano graphene sheet or platelet do not have an adverse effect on its electrical conductivity since electrons move primarily through the graphene plane, not along the edges. If or when functional groups or defects are attached to the two primary surfaces (graphene planes) of a graphene sheet or platelet, the electron mobility would be significantly curtailed since these defect sites would scatter electrons.

In this context, since GO platelets typically already had a certain density of defects or functional groups at the edges and on the graphene planes when they were produced, they exhibited a lower conductivity compared with pristine NGPs prior to chemical functionalization. When azide groups were brought in contact with GO platelets, functional groups attacked both the edges and the primary surfaces (graphene planes), replacing pre-existing groups. These replacements did not lead to any significant reduction in conductivity; this reduction became appreciable only after new defect sites were created by additional reactions, possibly after a majority of pre-existing groups were replaced.

For a pristine graphene sheet or platelet, it is reasonable to state that the azide molecules began to attack the more vulnerable edges and would likely cover a significant or a major portion of the available sites at the edges before they attack the much stronger bonds inside a graphene plane. This implies that only after 1.5 hours of reaction that the azide molecule began to anchor one of its ends to the primary surface of graphene, thereby inflicting a reduction in electrical conductivity. These observations further validate the assertion that NGPs and CNTs are distinct classes of carbon nano materials and their chemical and physical behaviors are very different.

The data shown in FIG. 5 and the FTIR spectra also indicate that the higher temperature reactions between the azide compound and NGPs began much sooner than those between the azide and CNTs, which did not occur for 3 hours at 160° C. The former reactions began as soon as NGPs (both p-NGPs and GO) were brought into contact with the azide compound, as evidenced by the infrared and Raman spectra. During the first hour, the chemical groups pre-existing at the graphene edges were rapidly replaced by the azide compound, but this substitution did not significantly affect the electrical conductivity of NGPs. Only after the chemical groups on the GO surfaces were substantially replaced by azide groups or when azide groups began to anchor onto the graphene plane of p-NGP, could we begin to observe a significant reduction in electrical conductivity.

Figure 6A:
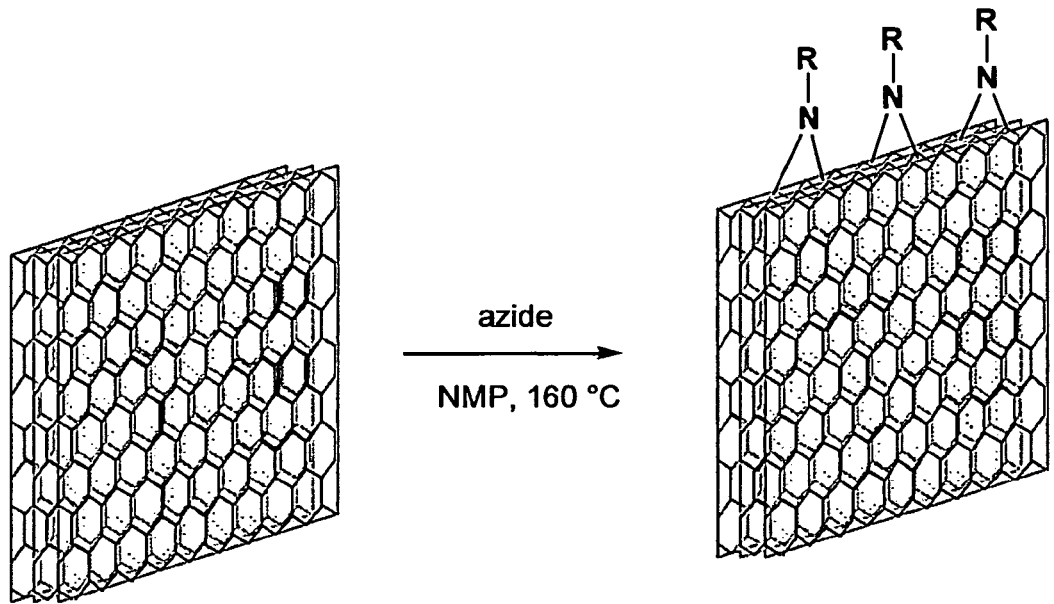
FIG. 6 (a) chemical functionalization of NGPs with azide groups occurs to the NGP edges first, which improves the solubility or dispersibility of NGPs without significantly inducing changes to the properties of the graphene plane; (b) As azide compound reactions proceed further, functionalization occurs to the graphene plane itself.
Figure 6B:
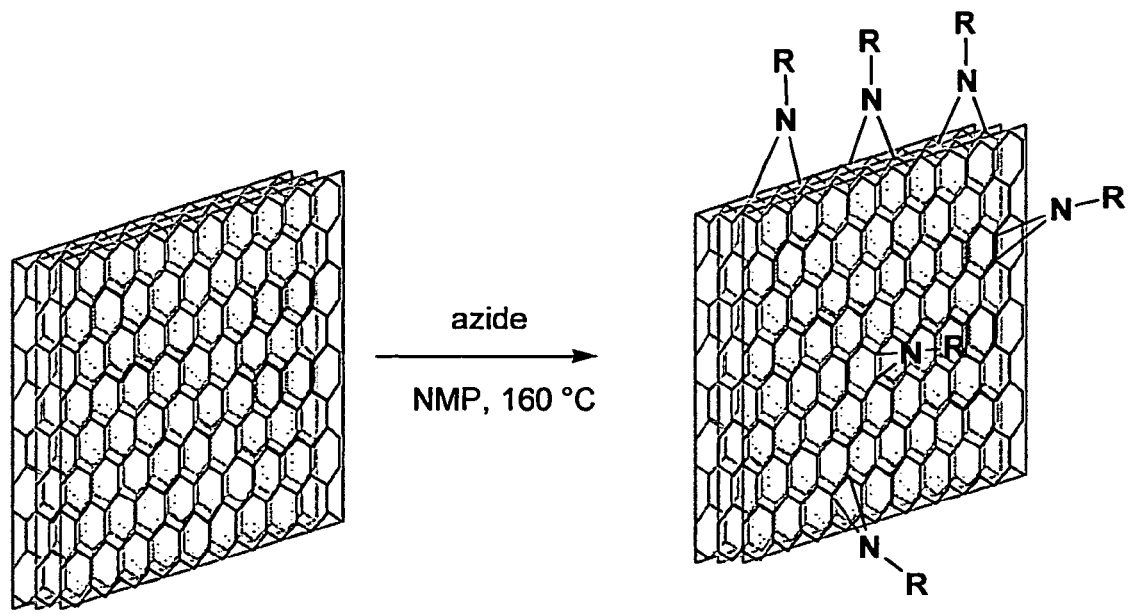

In summary, as illustrated in FIG. 6(a), chemical functionalization of NGPs with azide groups occur to the NGP edges first, which improves the solubility or dispersibility of NGPs without significantly inducing changes to the properties of the graphene plane. As azide compound reactions proceed further, functionalization occurs to the graphene plane itself (FIG. 6(b)). Such a sequence is not observed with the functionalization of CNTs.

The above discussions indicate that azide groups readily react with NGPs under very mild conditions (e.g., at a temperature as low as 100° C.), but not CNTs. For NGPs, reactions typically began as soon as the reactants are mixed together and are typically completed within 1 to 2 hours. For CNTs, reactions either did not occur at all (e.g., at 100° C.) or, if ever initiated (e.g. at 160° C. or greater), could not be completed for 4-6 hours. The presently invented graphene functionalization process, being so simple and involving only mild reaction conditions, appears to be amenable to scaling up for mass production. The advantages of the invented functionalization approach include: being a green process, involving only inexpensive or recyclable materials, few reaction steps (essentially one step), and the functional group density being controllable.

Thus, one of the preferred embodiments of the present invention is a process for producing chemically functionalized nano graphene materials. This process includes mixing a nano graphene material, an azide compound (including bi-radical compounds), and an organic solvent in a reactor and allowing a chemical reaction between the nano graphene material and the azide compound to proceed at a temperature for a length of time sufficient to produce the desired functionalized NGPs. The starting nano graphene material can be pristine graphene, graphene oxide, or a combination of both. The nano graphene material may be produced from any type of graphitic material, not just natural graphite, which was used in all prior art processes (other than those used by the applicants). The graphitic material may be selected from the group consisting of natural graphite, artificial graphite, highly oriented pyrolytic graphite, carbon fiber, graphite fiber, carbon nano-fiber, graphitic nano-fiber, meso-carbon microbead, graphitized coke, and combinations thereof.

The azide compounds herein discussed may be selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, and combinations thereof, where R=any one of the

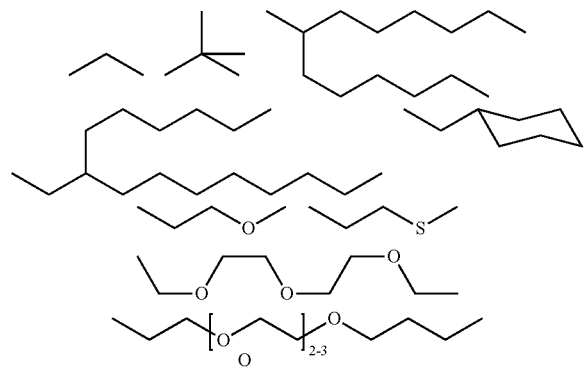

-continued

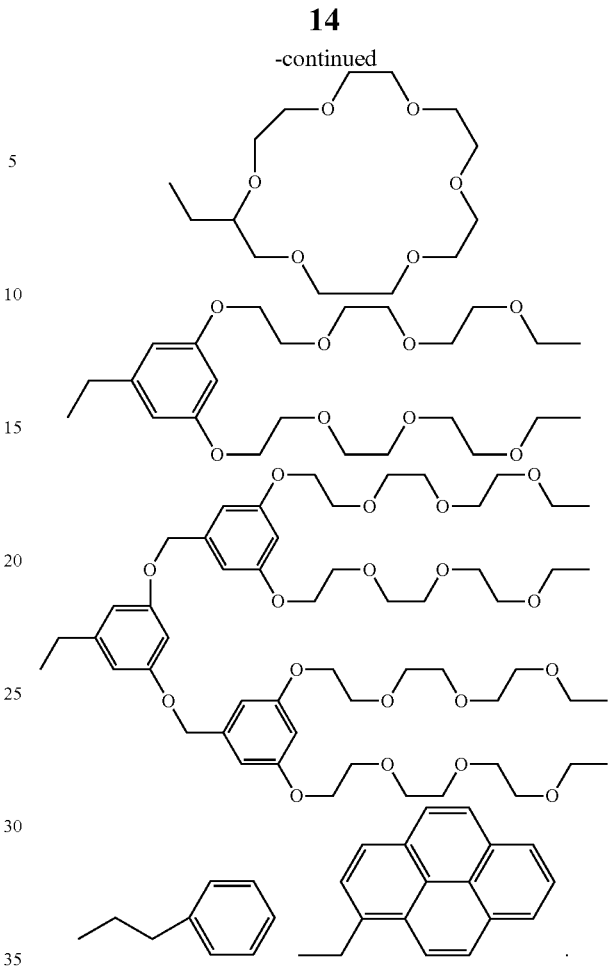

Once the functional groups are covalently anchored to the NGPs, the next logical step is to determine if f-NGPs would exhibit improved solubility/dispersibility in a solvent or enhanced interfacial adhesion between NGPs and a polymer matrix in a composite. Further, it is of technological significance to determine if it is possible to directly graft polymers from the NGP surfaces with the functional groups acting as initiating sites. A positive answer to this question would mean that polymer-grafted NGPs, which have a broad array of potential applications, can be produced cost-effectively.

To obtain answers to these questions, several chemical reactions were performed on the f-NGP, as shown in FIG. 7(a)-FIG. 7(d). Surface-initiated polymerization, generally termed the "grafting from" approach, has been adopted to covalently graft a range of polymer chains from the surface of CNTs. To verify if hydroxyl groups were successfully added to NGPs, ring-opening polymerizations (ROP) of ε-caprolactone and cationic polymerization of glycidyl methacrylate (GMA) from NGP-OH were carried out to produce NGP-g-PCL and NGP-g-PGMA, respectively (FIG. 7(a)), which were confirmed by spectroscopy data.

NGP-NH$_2$ was reacted with palmitoyl chloride to verify that amino groups were indeed introduced onto NGPs (FIG. 7(b)). In order to further demonstrate that bromine groups were successfully linked to NGPs to form NGP-Br, in situ atom transfer radical polymerization (ATRP) was carried out with NGP-Br as a macro-initiator, and styrene, methyl methyacrylate (MMA), and 3-azido-2-hydroxypropyl methacrylate (GMAN3) as monomers to obtain NGP-g-PS, NGP-g-PMMA, and NGP-g-PGMAN3, respectively (FIG. 7(c)).

Additionally, Pt/NGP nano-hybrids were prepared from NGP-COOH by reducing $K_2PtCl_4$ in an ethylene glycol-water solution that further confirmed the presence of carboxyl groups (FIG. 7(d)).

Thus, another preferred embodiment of the present invention is a process for producing chemically functionalized and polymer-grafted nano graphene materials. This process includes mixing a nano graphene material, an azide compound, and an organic solvent in a reactor and allowing a chemical reaction between the nano graphene material and the azide compound to proceed at a temperature for a length of time sufficient to produce NGPs with a desired functional group attached thereto. This step is followed by a chain grafting or polymerizing step by which a polymer chain is attached to or reacted with the desired functional group.

Up to this point of discussion, one may conclude that the proposed nitrene chemistry-based, single-step production technology for preparing functional NGPs has several major advantages:

(1) Azides (or bi-radical compounds) can be synthesized in large quantities under relatively mild conditions;
(2) The process is environmentally friendly since the decomposed gas is nitrogen and the solvent can be recycled;
(3) The functionalization process does not induce severe damage to NGPs;
(4) Almost no other functional group except the desired one is anchored on the NGPs, making the f-NGPs structurally well-defined materials;
(5) Various functional groups (for example, —OH, —$NH_2$, —COOH, —Br) can be introduced onto NGPs in merely one reaction;
(6) The reaction can be easily performed by thermolysis; and
(7) The approach is applicable to functionalization of both pristine NGPs and oxidized NGPs (or GO).

The ability to functionalize the edges only, without inflicting damage to the bulk or in-plane structure of a graphene sheet, is a highly desirable feature. This would enable good solubility of NGPs in a solvent for subsequent processing of NGPs or NGP composites without adversely altering their properties. This feature is not available to the functionalization of CNTs. This feature would also enable improved chemical compatibility or interfacial bonding between NGPs and a matrix polymer without compromising the structure and properties of the NGPs, resulting in significantly improved composite properties.

In some of the graphene oxide-producing processes developed by us, a controlled density of carboxylic acid groups is naturally attached to the surfaces or edges of graphene oxide (GO) platelets when they are made. Although carboxylic acid-laden GO platelets are soluble in water and other highly polar solvents, such as alcohols, they are not soluble in many other useful solvents. Further, upon removal of solvent, the resulting GO platelets tend to agglomerate through van der Waals force-induced re-stacking of GO nano sheets. Furthermore, GO platelets with carboxylic acids do not necessarily provide the best interfacial bonding between NGPs and a desired polymer matrix. Other functional groups may be more effective in promoting interfacial bonding in a particular composite material. The present invention provides an effective approach to overcome the aforementioned issues.

In summary, the present invention provides a single-step process for chemically functionalizing the NGPs that were prepared independently and prior to the functionalization operation. These NGPs could be produced by any process schematically shown in FIG. 1 or FIG. 2.

Additionally, the applicants proceeded to carry out further research and development efforts to explore the opportunities of integrating or combining the NGP production operation and NGP functionalization operation into one step, as opposed to sequentially producing NGPs and then chemically functionalizing the NGPs on a separate basis.

Figure 2:
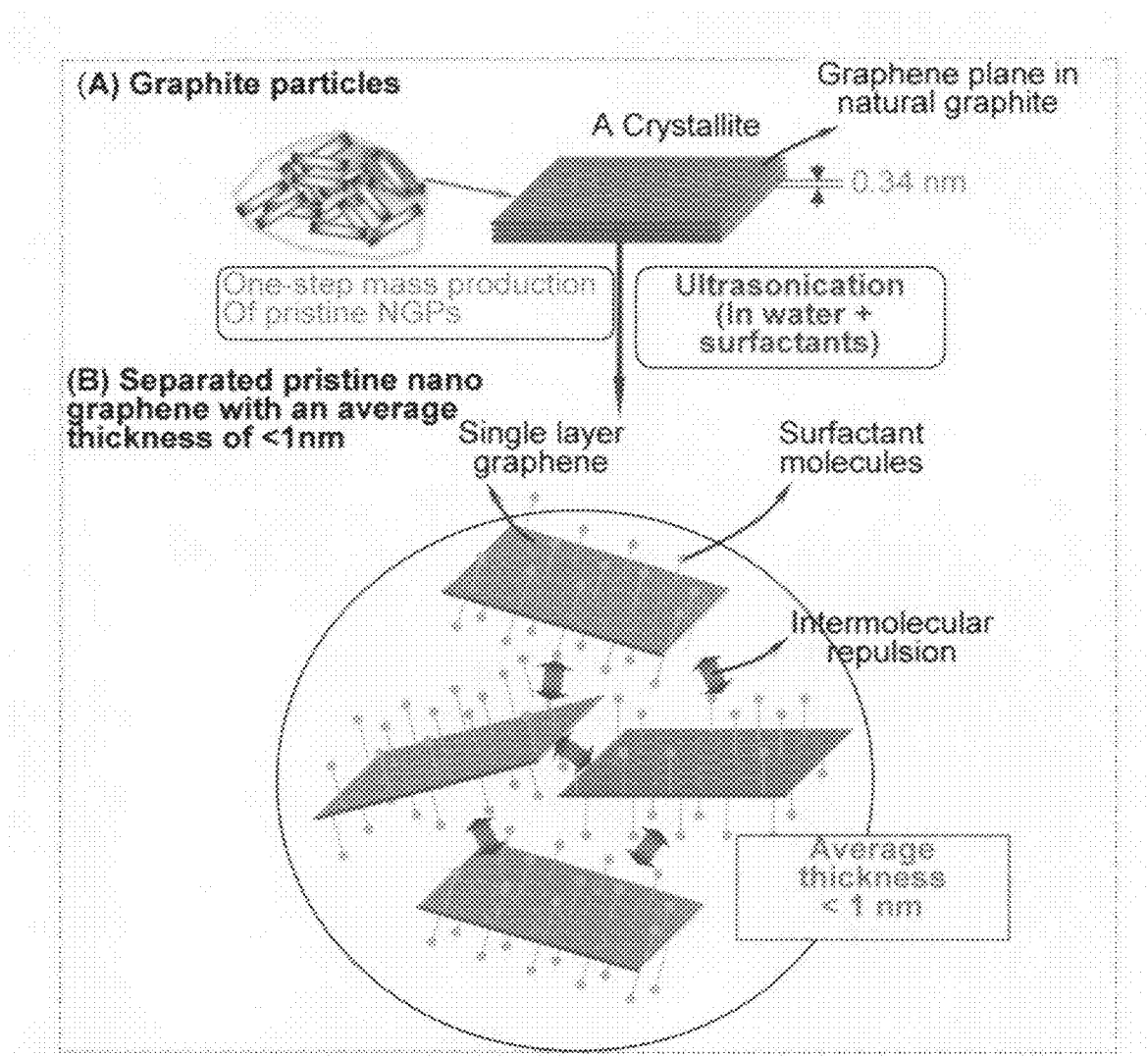
FIG. 2 A surfactant-assisted direct ultrasonication method for the production of pristine graphene, as disclosed earlier by the instant applicants.

As described earlier in the Background of the Invention section and specifically illustrated in FIG. 2, the applicant's research group was the very first to discover the direct ultrasonication process capable of manufacturing ultra-thin graphene in large quantities directly from pristine graphite, without prior chemical intercalation or oxidation. This direct ultrasonication process involves simply dispersing pristine graphite powder particles in a liquid medium (e.g., water, alcohol, acetone, or other solvent) containing a dispersing agent or surfactant to obtain a suspension. The suspension is then subjected to an ultrasonication treatment, typically at a temperature between 0° C. and 100° C. for 10-120 minutes. No prior chemical intercalation or oxidation is required. The pristine graphite material has never been exposed to any obnoxious chemical. This process combines expansion, exfoliation, and separation into one step, obviating the need to expose graphite to a high-temperature or chemical oxidizing environment.

Figure 8:
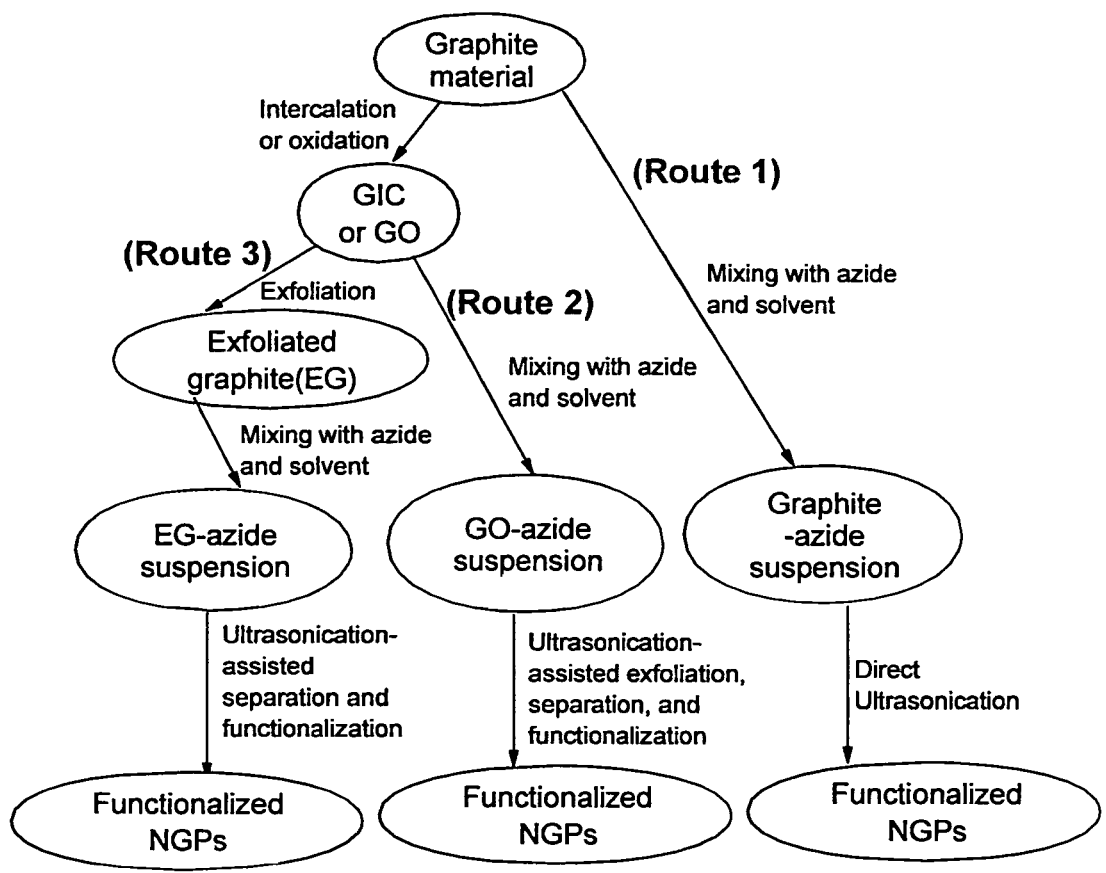
FIG. 8 Schematic of the three routes along which we can produce chemically functionalized NGPs. The process can begin with dispersing a pristine graphite material, a pre-intercalated or oxidized graphite (no exfoliation and flake separation), or an exfoliated graphite material (with or without flake separation) to obtain a suspension, followed by ultrasonication step.

This direct ultrasonication approach was herein extended to concurrently produce NGPs and functionalize NGPs, as illustrated as Route 1 in FIG. 8. This modified process entails replacing water with NMP and adding an azide compound and graphite powder into the liquid solvent in a reactor. The resulting suspension is then subjected to ultrasonication, typically for a period of time in the range of 20 to 120 minutes. We were most surprised to observe that the product was ultra-thin nano graphene platelets (with lots of single-layer graphene) that have been chemically functionalized. In other words, we succeeded in integrating the operations of graphite expansion, exfoliation, separation, and chemical functionalization into ONE single step. This is in stark contrast to the conventional NGP production processes that require so many steps and undesirable chemicals, as illustrated in FIG. 1. This strikingly simple process of manufacturing functionalized NGPs directly from a graphite material and in large quantities is truly a breakthrough in the art of nano graphene.

Hence, another preferred embodiment of the present invention is a combined production-functionalization process for manufacturing a chemically functionalized nano graphene material directly from a pristine (non-intercalated and non-oxidized) graphite material. This integrated process comprises (A) Dispersing the graphite material and an azide compound in a liquid medium comprising a solvent to form a suspension in a reactor; and (B) Subjecting the suspension to direct ultrasonication with ultrasonic waves of a desired intensity for a length of time sufficient to produce nano graphene platelets and to enable a chemical reaction to occur between the nano graphene platelets and the azide compound to produce the desired functionalized nano graphene material. This graphite material may be selected from the group consisting of natural graphite, artificial graphite, highly oriented pyrolytic graphite, carbon fiber, graphite fiber, carbon nano-fiber, graphitic nano-fiber, meso-carbon micro-bead, graphitized coke, and combinations thereof.

In this direct ultrasonication process, the azide compound may be added to the liquid medium before the ultrasonic power is turned on. Alternatively, the azide compound may be added sequentially after the graphite material is ultrasonicated for some period of time. Both procedure sequences are very effective in generating functionalized NGPs.

Further alternatively, functionalized NGPs may be manufactured from intercalated or oxidized graphite, as illustrated as Route 2 and Route 3 in FIG. 8. In Route 2, the process begins with preparation of oxidized graphite or graphite oxide powder. The oxidized graphite or graphite oxide was not subjected to exfoliation and separation treatments. Instead, the oxidized graphite powder and an azide compound were added to a solvent to produce a graphite oxide-azide suspension in a reactor. This suspension is then subjected to ultrasonication, which assists in exfoliation, separation, and functionalization all at the same time to produce functionalized NGPs. In other words, the exfoliation and separation operations of the oxidized graphite were integrated with the chemical functionalization operation into one step, which is carried out inside the same reactor.

In Route 3 of FIG. 8, the graphite material is intercalated, oxidized, or halogenated to produce graphite intercalation compound (GIC), graphite oxide, or halogenated graphite. The GIC, graphite oxide, or halogenated graphite is then exposed to a thermal shock (e.g., at a temperature >300°-1,050° C. for 30-60 minutes) to produce exfoliated graphite (graphite worms). Without subjecting to a prior separation treatment (e.g., using air jet mill, high-shear mixer, or ultrasonicator), the exfoliated graphite is mixed with an azide compound in a solvent contained in a reactor. The resulting suspension is then subjected to ultrasonication, which not only break up graphite worms to form separated NGPs, but also functionalize the NGPs substantially at the same time in the same reactor.

The three processes depicted in FIG. 8 are highly innovative and have not been taught implicitly or explicitly in the prior art. Hence, another preferred embodiment of the present invention is a combined production-functionalization process for manufacturing a chemically functionalized nano graphene material directly from a non-intercalated and non-oxidized graphite material (Route 1). This process comprises (A) dispersing the graphite material and an azide compound in a liquid medium comprising a solvent to form a suspension; and (B) subjecting the suspension to direct ultrasonication with ultrasonic waves of a desired intensity for a length of time sufficient to produce nano graphene platelets and to enable a chemical reaction to occur between the nano graphene platelets and the azide compound to produce the functionalized nano graphene material.

Still another preferred embodiment of the present invention is a combined production-functionalization process for manufacturing a chemically functionalized nano graphene material directly from an intercalated, oxidized, or halogenated graphite material (Route 3). This process comprises (A) producing exfoliated graphite from the intercalated or oxidized graphite material; (B) dispersing the exfoliated graphite and an azide compound in a liquid medium comprising a solvent to form a suspension; and (C) subjecting the suspension to ultrasonication with ultrasonic waves of a desired intensity for a length of time sufficient to produce nano graphene platelets and to enable a chemical reaction to occur between the nano graphene platelets and the azide compound to produce the functionalized nano graphene material.

A further preferred embodiment of the present invention is a combined production-functionalization process for manufacturing a chemically functionalized nano graphene material directly from an intercalated, oxidized, or halogenated (e.g., fluorinated) graphite material (Route 2). The process comprises (A) dispersing said intercalated, oxidized, or fluorinated graphite material and an azide compound in a liquid medium comprising a solvent to form a suspension; and (B) subjecting the suspension to ultrasonication with ultrasonic waves of a desired intensity for a length of time sufficient to produce nano graphene platelets and to enable a chemical reaction to occur between the nano graphene platelets and the azide compound to produce the functionalized nano graphene material.

In general, a combined production-functionalization process for manufacturing a chemically functionalized nano graphene material from a graphite material has been developed. This highly innovative process comprises: (A) Dispersing a graphite material and a bi-functional or multi-functional compound in a liquid medium to form a suspension; and (B) Subjecting the suspension to direct ultrasonication with ultrasonic waves of a desired intensity or power level for a length of time sufficient to produce nano graphene platelets and to enable a chemical reaction to occur between the nano graphene platelets and the compound to produce the functionalized nano graphene material.

The bi-functional or multi-functional compounds have two, three, four, or more functional groups (e.g., $-NH_2$) at their two, three, four, or more ends, respectively. At least one of the functional groups is capable of reacting with an NGP at an edge or graphene plane. Azide compounds are among many available di-functional and multi-functional compounds suitable for use in this highly versatile process. It appears that high-power ultrasonication is capable of activating the edges or graphene planes of NGPs and enabling many functionalization reactions to readily initiate and proceed. The graphite material may be selected from a wide range of graphitic materials, including natural graphite, artificial graphite, highly oriented pyrolytic graphite, carbon fiber, graphite fiber, carbon nano-fiber, graphitic nano-fiber, mesocarbon micro-bead, graphitized coke, pre-intercalated versions thereof, pre-oxidized versions thereof, pre-fluorinated versions thereof, chemically modified versions thereof, and combinations thereof. Oxidation, fluorination, and other chemical modifications (e.g., bromination) of graphite are well-known in the art. For instance, fluorinated graphite can be prepared according to several processes cited in R. Yazami et al ["Subfluorinated graphite fluorides as electrode materials," U.S. Pat. No. 7,563,542, Jul. 21, 2009]. Other halogenated graphite materials, such as chlorinated graphite ($C_8Cl$) and brominated graphite ($C_8Br$), can be obtained by making a graphite material and a halogen or halogen compound react at a temperature greater than room temperature. The presently invented process is applicable to pristine versions and various chemically modified versions of the above-listed graphitic materials.

The chemically functionalized nano graphene platelets produced with this process typically comprise a significant portion of single-layer graphene. The chemical reaction can be controlled to occur only to an edge or edges of the nano graphene platelets or, alternatively, to an edge and at least one primary surface, graphene plane, of said nano graphene platelets.

EXAMPLES

Materials

Both pristine graphene and graphene oxide materials were obtained from Angstron Materials, LLC (Dayton, Ohio) and the product codes were N002N (pristine) and N002P (graphene oxide). The multi-walled carbon nanotubes (MWNTs) were purchased from (purity >95%). The single-walled carbon nanotubes (SWNTs) were acquired from Shenzhen Nanotech Port Co. (purity of CNTs >90%, purity of SWNTs >50%). Succinic anhydride (98%), stannous octoate ([CH$_3$(CH$_2$)$_3$CH(C$_2$H$_5$)COO]$_2$Sn, 95%), and ethylene glycol (99%) were purchased from Aldrich and used as received. 2-Bromoisobutyryl bromide (98%), N,N,N',N'',N''-pentamethyldiethylenetriamine (PMDETA, 99%), N,N-(dimethylamino)pyridine (DMAP, 98%), and boron trifluoride diethyl etherate (BF$_3$·OEt$_2$, 98%) were purchased from Alfa Aesar and used as received. ε-Caprolactone (Acros, 99%) and palmitoyl chloride (Fluke, 97%) were used without further purification. Sodium azide (95%), 2-chloroethanol (99%), 3-chloropropylamine hydrochloride (98%), potassium tetrachloroplatinate(II) (K$_2$PtCl$_4$, 99%), N-methyl-2-pyrrolidinone (NMP), acetone, tetrahydrofuran (THF), N,N-dimethyl formamide (DMF), chloroform, and other solvents were obtained from Shanghai Reagents Company and used as received. Glycidyl methacrylate (GMA, Alfa Aesar, 95%) was purified by passing through a column filled with basic alumina to remove the inhibitor. Triethylamine (Et$_3$N), dichloromethane (CH$_2$Cl$_2$), methyl methacrylate (MMA, Alfa Aesar, 99%), and styrene (St, Alfa Aesar, 98%) were dried with CaH$_2$ and distilled under reduced pressure before use. CuBr (Aldrich, 99.999%) was obtained from Aldrich and purified according to the published procedures. (19) The monomer of 3-azido-2-hydroxypropyl methacrylate (GMAN3) was prepared by reaction of GMA and sodium azide in the mixture of water and THF (5/1 by volume) at room temperature for 48 h.

Large-Scale Synthesis of 2-Azidoethanol

In a typical procedure, a solution of sodium azide (195 g, 3.0 mol) in deionized water (780 mL) and 2-chloroethanol (120.8 g, 1.5 mol) was to a 2000 mL three-neck round-bottom flask equipped with a condenser. The flask was immersed in an oil bath at 70° C. and stirring was maintained for 96 h. After cooling to room temperature, the reaction mixture was extracted with diethyl ether (5×100 mL). The extracts were dried over anhydrous MgSO$_4$ overnight, filtered, concentrated on a rotary evaporator, and distilled under reduced pressure to produce an oil-like, colorless substance. The yield was 214.4 g or 82%.

Large-Scale Synthesis of 3-Azidopropan-1-amine

A solution of sodium azide (195 g, 3.0 mol) in deionized water (800 mL) was added into a three-neck round-bottom flask equipped with a condenser. Then 3-chloropropylamine hydrochloride (195 g, 1.5 mol) dissolved in 300 mL of deionized water was added. After continued stirring at 75-78° C. for 96 h, the white precipitate (NaCl) was removed as a byproduct from the reaction mixture by filtration. The yellow filtrate was basified with aqueous NaOH to pH≈10-11 and further extracted with diethyl ether (5×200 mL). The organic fraction was dried over anhydrous MgSO$_4$ overnight, filtered, concentrated on a rotary evaporator, and distilled under reduced pressure to produce a colorless oil. The yield was: 108.4 g, 72%. $^1$H NMR (CDCl$_3$, δ, ppm): 3.35 (t, 2H, CH$_2$N$_3$), 2.78 (t, 2H, NH$_2$CH$_2$), 1.71 (p, 2H, CH$_2$CH$_2$CH$_2$), 1.27 (s, 2H, NH$_2$).

Synthesis of 4-(2-Azidoethoxy)-4-oxobutanoic Acid

Succinic anhydride (23.0 g, 0.230 mol) was added into a three-neck round-bottom flask equipped with a condenser and a dropping funnel. Under nitrogen atmosphere and magnetic stirring, freshly distilled methylene chloride (150 mL), DMAP (2.3 g, 19 mmol) and freshly distilled Et$_3$N (46.46 g, 0.460 mol) was sequentially added. After the flask was immersed into an ice-water bath, 2-azidoethanol (20.0 g, 0.230 mol) was added dropwise into the previous solution. The solution was later heated at 40° C. for 48 h, and the reaction mixture was washed successively with 1 M HCl solution (5×100 mL) and deionized water (2×100 mL). The organic phase was dried over anhydrous MgSO$_4$ overnight. After filtering and removal of methylene chloride under reduced pressure, the final product was obtained as a yellow viscous liquid. The yield was: 38.4 g, 90%. 1H NMR (CDCl$_3$, δ, ppm): 4.20 (t, 2H, N$_3$CH$_2$CH$_2$), 3.42 (t, 2H, N$_3$CH$_2$), and 2.61 (m, 4H, CH$_2$CH$_2$COOH).

Synthesis of 2-Azidoethyl-2-bromo-2-methylpropanoate

2-Azidoethanol (17.40 g, 0.2 mol), freshly distilled methylene chloride (150 mL), and Et3N (21.21 g, 0.21 mol) were added into a three-neck round-bottom flask equipped with a condenser and a dropping funnel. Under nitrogen atmosphere and magnetic stirring, freshly distilled anhydrous methylene chloride (150 mL), DMAP (1.7 g, 14 mmol), and freshly distilled anhydrous Et3N (46.5 g, 0.46 mol) were sequentially added. After the flask was immersed into an ice-water bath, 2-bromoisobutyryl bromide (48.28 g, 0.21 mol) was added dropwise into the previous solution. Twenty-four hours later, the reaction mixture was washed successively with 1 M HCl (3×200 mL) solution and deionized water (1×200 mL). The organic phase was dried over anhydrous MgSO$_4$ overnight. After filter and removal of methylene chloride on a rotary evaporator, the obtained residues were distilled under reduced pressure to give a colorless viscous liquid. The yield was: 33.4 g, 70%. 1H NMR (CDCl$_3$, δ, ppm): 4.24 (t, 2H, N$_3$CH$_2$CH$_2$), 3.52 (t, 2H, N$_3$CH$_2$), 1.96 (s, 6H, (CH$_3$)$_2$Br).
Preparation of NGP-OH, NGP-NH$_2$, NGP-COOH, and NGP-Br In a typical experiment (feed ratio, R$_{feed}$=20/1 (w/w)), pristine NGPs (1.00 g) and N-methyl-2-pyrrolidinone (NMP, 80 mL) were placed in a 250 mL Schlenk flask fitted with a condenser. The mixture was treated with an ultrasonic bath (40 kHz) for 2 h and then placed on a magnetic stirrer with an oil bath. After the mixture was bubbled with nitrogen for 15 min, 2-azidoethanol (20.0 g, 0.23 mol) was added via syringe. The reaction mixture was then heated and maintained around 160° C. in a nitrogen atmosphere under constant stirring for 18 h. After cooling down to room temperature, the product was isolated by precipitation into acetone. The resulting precipitates were re-dispersed in acetone with the aid of an ultrasonic bath and then collected by centrifugation. This centrifugation was repeated until the upper layer was nearly colorless. The separated solid was sequentially re-dispersed in water and purified by at least five centrifugation cycles. All these centrifugations were performed at a rotation speed of at 14,500 rpm for 3 min using 30 mL plastic centrifuge tubes. The supernatant was decanted and the black solid was dried under vacuum at 60° C. overnight to give 1.04 g of NGP-OH. Thus, this is a weight-increase process, and the mass loss of neat NGPs during the preparation methods is less than 10%. One additional batch of 5-10 g of non-pristine NGPs (GO) and similar, dispersed functional NGPs were obtained.

The same procedure was also used to prepare NGP-NH$_2$, NGP-COOH, and NGP-Br, but 2-azidoethanol was substituted by 3-azidopropan-1-amine, 4-(2-azidoethoxy)-4-oxobutanoic acid, and 2-azidoethyl 2-bromo-2-methylpropanoate, respectively.
Synthesis of NGP-g-PCL by Ring-Opening Polymerization (ROP)

Into a 50 mL Schlenk flask, as-prepared NGP-OH (R$_{feed}$=20/1, 50 mg) was charged, and the flask was then sealed with a rubber plug. The flask was evacuated and filled thrice with high-purity nitrogen. ε-Caprolactone (6.0 g, 53 mmol) and stannous octoate (2 mg) were injected into the flask via a syringe. The reaction was allowed to proceed for 24 h at 120° C. under constant stirring. The product was filtered and washed thoroughly with excess chloroform several times. The final product was dried under vacuum overnight to give 54 mg of NGP-g-PCL.

Synthesis of NGP-g-PGMA by Cationic ROP

Into a dried Schlenk flask as-prepared MWNT-OH (Rfeed=20/1, 20 mg), dried $CH_2Cl_2$ (15 mL) and GMA (4.0 g, 28 mmol) were added under nitrogen. The flask was then treated with ultrasonic bath for 1 min before placed into ice-water bath. $BF_3.OEt_2$ (0.1 mL) was injected into the reaction mixture by syringe quickly. After 24 h, the cationic polymerization was ended by adding a small amount of methanol. The resulting product was washed with methanol and separated by centrifuging. The final product was dried under vacuum overnight to give 17 mg of NGP-g-PGMA.

Synthesis of NGP-PC by Amidation $NGP-NH_2$ (20 mg) was dispersed via ultrasonication in 8 mL of dried $CHCl_3$. After dried Et3N (3.5 g, 35 mmol) and palmitoyl chloride (3 g, 11 mmol) were added, the reaction was allowed to proceed at room temperature for 24 h. The product was isolated by centrifugation and rinsed in turn with 1 M HCl, deionized water, and acetone. The black solid was collected and dried overnight under vacuum to give 18 mg of NGP-PC.

Preparation of Pt/NGP Nano-Hybrids

The as-prepared NGP-COOH (20 mg) and 40 mL of ethylene glycol-water solution (3:2 volume ratio) were placed into a 100 mL Schlenk flask, which was then treated with an ultrasonic bath (40 kHz) for 3 min. $K_2PtCl_4$ (12.8 mg, 0.03 mmol) was added into the flask before the reactive mixture was heated in a 125° C. oil bath under nitrogen atmosphere for 4 h. The product was centrifuged, rinsed several times with deionized water, and dried at 60° C.

Synthesis of NGP-g-PMMA by Atom Transfer Radical Polymerization (ATRP)

To a 25 mL Schlenk flask containing a magnetic stirrer, 50 mg of NGP-Br was dispersed in 2 mL of THF upon sonication for 15 min before MMA (0.5 g, 5 mmol), CuBr (11.5 mg, 0.08 mmol), and PMDETA (17 μL, 0.08 mmol) were added under nitrogen. The flask was then sealed and stirred at 40° C. for 24 h. The mixture showed obvious viscosity at the end of the reaction. The mixture was subsequently diluted to THF, centrifuged, and rinsed several times with THF to remove any un-grafted polymer. A black solid NGP-g-PMMA (66 mg) was obtained after vacuum-drying overnight.

Synthesis of NGP-g-PS by ATRP

In a 25 mL Schlenk flask, 50 mg of MWNT-Br was dispersed via sonication for 15 min in 0.91 g of styrene. CuBr (18.5 mg, 0.13 mmol) and PMDETA (21 μL, 0.10 mmol) were added under a nitrogen atmosphere. The flask was placed in an oil bath at 80° C. under magnetic stirring. After 24 h, the viscosity was clearly increased. The mixture was cooled to room temperature and washed by repeated dispersing in THF and centrifuging. The black solid was collected and dried under vacuum at 30° C. to a constant weight, giving rise to 24 mg of NGP-g-PS.

Synthesis of NGP-g-GMAN3 by ATRP

In a 25 mL Schlenk flask, 30 mg of NGP-Br was dispersed via sonication for 15 min in 1.5 mL of THF. GMAN3 (0.40 g, 2.2 mmol), CuBr (7.8 mg, 0.05 mmol) and PMDETA (11 μL, 0.05 mmol) was added under a nitrogen atmosphere. The resulting mixture was stirred for 24 h at 25° C. The solid was then separated from the mixture by centrifuging and washed with acetone. The black solid was collected and dried under vacuum at 30° C. to a constant weight, providing 16 mg of NGP-g-GMAN3.

Characterization of Materials Synthesized:

A combination of the following techniques, when deemed necessary, was used to characterize the functional groups attached to NGPs for functionalized versions of both pristine graphene and graphene oxide:

(1) Thermogravimetric analysis (TGA) was used to determine the level of surface functionalization. Since most functional groups were labile or decompose upon heating, and the NGPs are stable up to 1200° C. under argon (Ar) atmosphere, the weight loss at 800° C. under Ar was used to determine functionalization ratio.

(2) X-ray photoelectron spectroscopy (XPS) was used to confirm the presence of different elements in functionalized NGPs. De-convolution of XPS signals was useful for studying fine structures on NGPs.

(3) Raman spectroscopy: The tangential G mode (ca. 1550-1600 $cm^{-1}$) was characteristic of $sp^2$ carbons on the hexagonal graphene network. The D-band, so-called disorder mode (found at ca. 1295 $cm^{-1}$), appears due to disruption of the hexagonal $sp^2$ network of NGPs. The D-band was be used to characterize functionalized NGPs and ensure that functionalization is covalent and occurs on the primary surfaces of a graphene sheet.

(4) Infrared (IR) spectroscopy was useful in characterizing functional groups bound to graphene surfaces. A variety of organic functional groups on graphene surfaces, such as COOH(R), $—CH_2$, $—CH_3$, $—NH_2$, and —OH, were identified using FTIR.

(5) UV/visible spectroscopy was used to provide information about the electronic states of NGPs, and hence functionalization. The absorption spectra showed bands near 1400 nm and 1800 nm for pristine NGPs. A loss or shift of such structure was be observed after chemical alteration of NGP surfaces.

(6) Solution $^1H$ NMR was of adequate sensitivity for characterizing NGPs functionalized by carbenes and nitrenes because of the high solubility of derivatized NGPs. Solid state $^{13}C$ NMR was employed to characterize several functionalized NGPs and show successful observation of organic functional groups, such as carboxylic and alkyl groups on graphene surfaces and edges.

(7) Atomic force microscopy (AFM) and transmission electron microscopy (TEM were used to characterize both un-treated and functionalized NGPs. The height profile on AFM was used to show presence of functional groups on a NGP surface. Measurements of heights along an individual graphene plane could be correlated with the substituent group, i.e., the larger an alkyl chain of a surface substituent, the greater the height measured.

The invention claimed is:

1. A combined production-functionalization process for producing a chemically functionalized nano graphene material from a halogenated graphite material and an azide or bi-radical compound, comprising:

(A) Producing exfoliated halogenated graphite from said halogenated graphite material, wherein said graphite material is selected from the group consisting of carbon fiber, graphite fiber, carbon nano-fiber, graphitic nano-fiber, meso-carbon micro-bead, graphitized coke, and combinations thereof;

(B) Dispersing said exfoliated halogenated graphite and said azide or bi-radical compound in a liquid medium to form a suspension; and (C) Subjecting said suspension to ultrasonication with ultrasonic waves of a desired intensity for a length of time sufficient to produce nano graphene platelets and to enable a chemical reaction to occur between said nano graphene platelets and said azide or bi-radical compound to produce said functionalized nano graphene material.

2. The process of claim 1 wherein said chemical reaction occurs only to an edge or edges of said nano graphene platelets.

3. The process of claim 1 wherein said chemical reaction occurs to an edge and at least one primary surface of said nano graphene platelets.

4. The process of claim 1 wherein said azide or bi-radical compound is selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

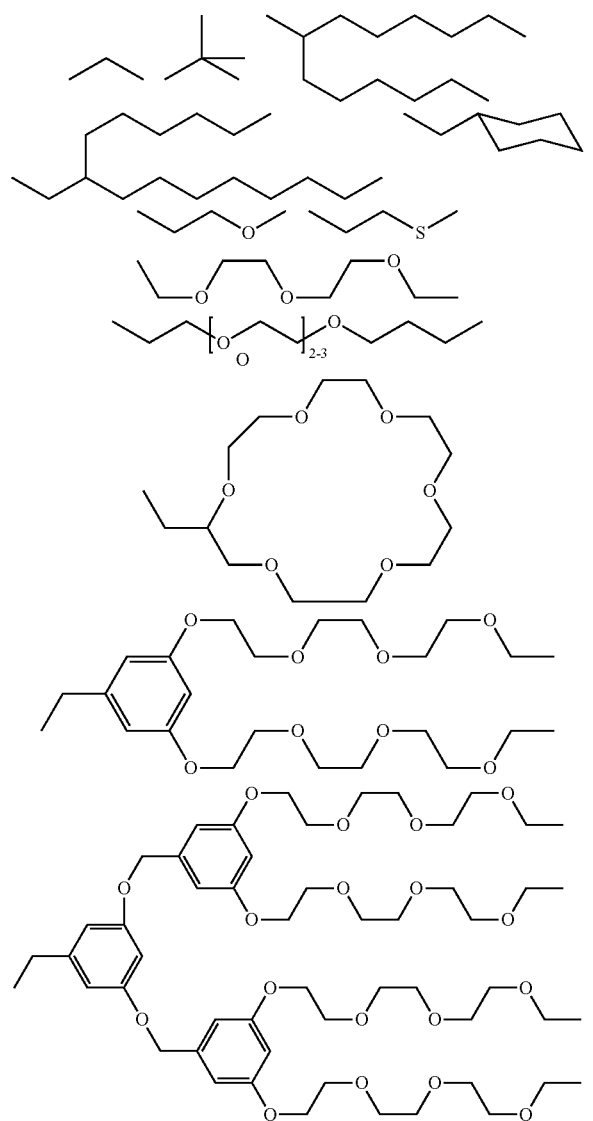

-continued

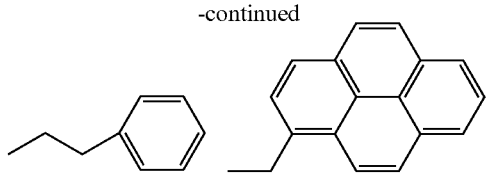

and combinations thereof.

5. A combined production-functionalization process for producing a chemically functionalized nano graphene material from a halogenated graphite material and an azide or bi-radical compound, wherein said graphite material is selected from the group consisting of carbon fiber, graphite fiber, carbon nano-fiber, graphitic nano-fiber, meso-carbon micro-bead, graphitized coke, and combinations thereof; said process comprising:
(A) Dispersing said halogenated graphite material and the azide or bi-radical compound in a liquid medium to form a suspension;
(B) Subjecting said suspension to ultrasonication with ultrasonic waves of a desired intensity for a length of time sufficient to produce nano graphene platelets and to enable a chemical reaction to occur between said nano graphene platelets and said azide or bi-radical compound to produce said functionalized nano graphene material.

6. The process of claim 5 wherein said azide or bi-radical compound is added to said liquid medium sequentially after said direct ultrasonication of said graphite material is allowed to proceed for a desired period of time.

7. The process of claim 5 wherein said graphite material is selected from the group consisting of natural graphite, artificial graphite, highly oriented pyrolytic graphite, carbon fiber, graphite fiber, carbon nano-fiber, graphitic nano-fiber, meso-carbon micro-bead, graphitized coke, and combinations thereof.

8. The process of claim 5 wherein said chemical reaction occurs only to an edge or edges of said nano graphene platelets.

9. The process of claim 5 wherein said chemical reaction occurs to an edge and at least one primary surface of said nano graphene platelets.

10. The process of claim 5 wherein said azide compound is selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

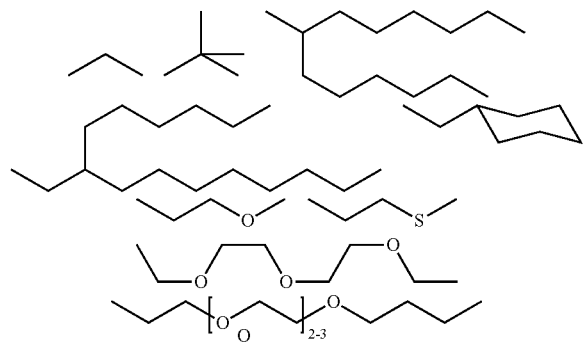

-continued

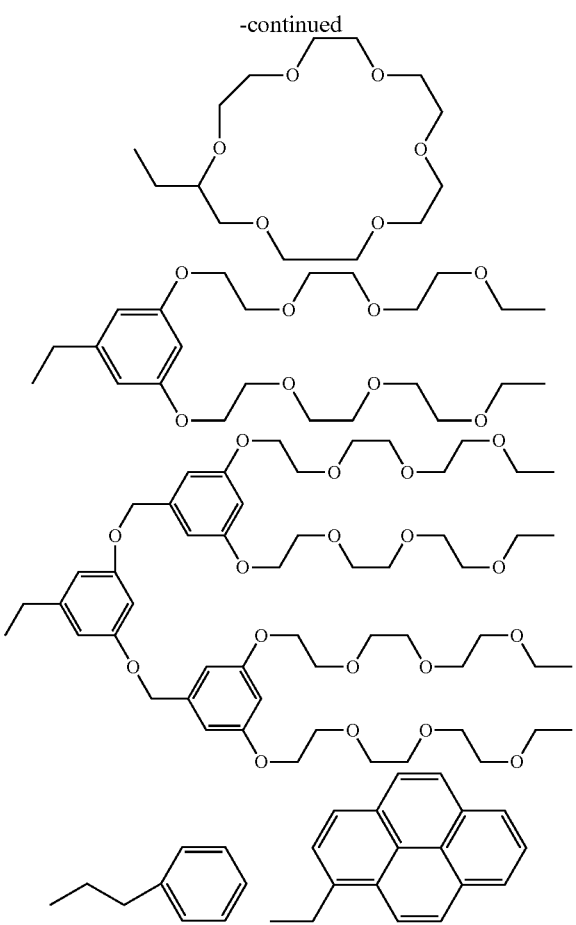

and combinations thereof.

11. The process of claim 5, further comprising a step of grafting a polymer chain to a functional group of said functionalized nano graphene material to produce a polymer-grafted nano graphene material.

12. A combined production-functionalization process for producing a chemically functionalized nano graphene material from a halogenated graphite material, comprising:
   (a) Producing exfoliated graphite from said halogenated graphite material, wherein said graphite material is selected from the group consisting of, carbon fiber, graphite fiber, carbon nano-fiber, graphitic nano-fiber, meso-carbon micro-bead, graphitized coke, and combinations thereof;
   (b) Dispersing said exfoliated graphite and an azide or bi-radical compound in a liquid medium to form a suspension; and
   (c) Subjecting said suspension to ultrasonication with ultrasonic waves of a desired intensity for a length of time sufficient to produce nano graphene platelets and to enable a chemical reaction to occur between said nano graphene platelets and said azide or bi-radical compound to produce said functionalized nano graphene material.

* * * * *